United States Patent
Ramasamy et al.

(10) Patent No.: US 10,420,023 B2
(45) Date of Patent: Sep. 17, 2019

(54) METHOD AND APPARATUS FOR MULTIPLE RADIO ACCESS TECHNOLOGY ANTENNA FRONT END CONTROLLER INTEGRATION

(71) Applicant: Dell Products, LP, Round Rock, TX (US)

(72) Inventors: Suresh K. Ramasamy, Austin, TX (US); Geroncio O. Tan, Austin, TX (US); Ricardo R. Velasco, Cumming, GA (US)

(73) Assignee: Dell Products, LP, Round Rock, TX (US)

( * ) Notice: Subject to any disclaimer, the term of this patent is extended or adjusted under 35 U.S.C. 154(b) by 54 days.

(21) Appl. No.: 15/867,690

(22) Filed: Jan. 10, 2018

(65) Prior Publication Data
US 2019/0215765 A1    Jul. 11, 2019

(51) Int. Cl.
*H04W 52/02*    (2009.01)
*H01Q 25/04*    (2006.01)
(Continued)

(52) U.S. Cl.
CPC ...... *H04W 52/0206* (2013.01); *H01Q 1/2291* (2013.01); *H01Q 25/04* (2013.01);
(Continued)

(58) Field of Classification Search
CPC .......... H04W 52/0206; H04W 52/243; H04W 52/288; H04W 88/08; H04B 1/3838; H04B 7/0456; H04B 7/024; H04B 7/0413
See application file for complete search history.

(56) References Cited

U.S. PATENT DOCUMENTS 7,813,451 B2    10/2010    Binder
8,204,446 B2    6/2012    Scheer
(Continued)

Primary Examiner — Shukri Taha
(74) Attorney, Agent, or Firm — Prol Intellectual Property Law, P.L.L.C.; H. Kenneth Prol

(57) ABSTRACT

A wireless adapter front end for an information handling system comprising a wireless adapter for communicating on a plurality of antennas for connection to a plurality of concurrently operating wireless links, wherein at least one of the plurality of antennas is configurable to have a plurality of antenna radiation patterns and is operating in a first antenna radiation pattern, a controller operating independently from an operating system of the information handling system and executing instructions of a dynamic tuning and power reduction control system to receive a trigger input indicating an operating condition of the plurality of antennas, wherein the trigger input may be selected from one or more indications of a radiation pattern of one or more of the antennas, a shared communication frequency band, a carrier aggregation operation, SAR proximity detection, or operation of a plurality of radio access technologies and to identify an optimal tuning and power reduction configuration associated with the trigger input and the first antenna radiation pattern in a truth table stored in a memory, wherein the optimal tuning and power reduction configuration defines a plurality of transmitting power levels, each of the plurality of transmitting power levels associated with one of the plurality of antennas.

20 Claims, 7 Drawing Sheets

(51) Int. Cl.
    *H01Q 1/22*     (2006.01)
    *H04B 1/3827*     (2015.01)
    *H04W 52/24*     (2009.01)
    *H04W 52/28*     (2009.01)
    *H04W 84/12*     (2009.01)

(52) U.S. Cl.
    CPC ........ *H04B 1/3838* (2013.01); *H04W 52/243* (2013.01); *H04W 52/288* (2013.01); *H04W 84/12* (2013.01)

(56) References Cited

U.S. PATENT DOCUMENTS

| | | |
|---|---|---|
| 8,325,097 B2 | 12/2012 | McKinzie, III |
| 8,618,990 B2 | 12/2013 | Somero |
| 8,781,437 B2 | 7/2014 | Ngai |
| 9,301,177 B2 | 3/2016 | Ballantyne |
| 9,306,613 B2 | 4/2016 | Black |
| 10,136,395 B1 * | 11/2018 | Koshy ................. H04W 52/223 |
| 2010/0323636 A1 | 12/2010 | Cowley |
| 2011/0244812 A1 | 10/2011 | Cowley |
| 2014/0155000 A1 | 6/2014 | Erkens |
| 2016/0164563 A1 | 6/2016 | Khawand |
| 2017/0181105 A1 | 6/2017 | John |
| 2018/0175944 A1 | 6/2018 | Seyed |
| 2018/0367177 A1 * | 12/2018 | Ramasamy .............. H04B 1/18 |

* cited by examiner

WLAN Power Cut Back Portion of Dynamic Power Reduction Truth Table 302

| WLAN Antenna Radiation Pattern | MCU Input Triggers ||| WLAN Power Cut Back Table |||||||
|---|---|---|---|---|---|---|---|---|---|
| | Tx/Rx Info | P Sensor | Embedded Chip Device State | 2.4 GHz ||| 5 GHz |||
| | | | | L | M | H | L | M | H |
| 1 | 1 | 1 | 1 | 2dB | 3dB | 1dB | 3dB | 3dB | 3dB |
| 2 | 1 | 0 | 1 | 0dB | 0dB | 0dB | 0dB | 0dB | 0dB |

Microcontroller Input Triggers 310

WLAN Signal Power Reduction Values 312

FIG. 3

| WWAN Power Reduction Portion of Dynamic Power Reduction Truth Table 402 | | | | WWAN Power Cut Back Table | | | | | | |
|---|---|---|---|---|---|---|---|---|---|---|
| MCU Input Triggers | | | | B7 (Port/Pin) | | | B46 (Port/Pin) | | | |
| WLAN Antenna Radiation Pattern | Tx/Rx Info | P Sensor | Embedded Chip Device State | L | M | H | L | M | H |
| 1 | 1 | 1 | 1 | 3dB | 3dB | 3dB | N/A | N/A | N/A |
| 2 | 1 | 0 | 0 | 3dB | 3dB | 3dB | N/A | N/A | N/A |
| 1 | 1 | 0 | 0 | 1dB | 1dB | 1dB | N/A | N/A | N/A |

Microcontroller Input Triggers 310

WWAN Signal Power Reduction Values 404

| MCU Input Triggers | | | | WWAN Tuner Code Table | | | | | | |
| --- | --- | --- | --- | --- | --- | --- | --- | --- | --- | --- |
| WLAN Antenna Radiation Pattern | Tx/Rx Info | P Sensor | Embedded Chip Device State | B7(Port/Pin) | | | | B46(Port/Pin) | | |
| | | | | L | M | H | | L | M | H |
| 1 | 1 | 1 | 1 | 47 | 47 | 47 | | 7 | 7 | 7 |
| 1 | 1 | 0 | 0 | 47 | 47 | 47 | | 7 | 7 | 7 |
| 2 | 1 | 0 | 0 | 36 | 36 | 36 | | 47 | 47 | 47 |

WWAN Tune Table Portion of Dynamic Power Reduction Truth Table 502

WWAN Tuning Index Register Identifiers 504

Microcontroller Input Triggers 310

*FIG. 5*

METHOD AND APPARATUS FOR MULTIPLE RADIO ACCESS TECHNOLOGY ANTENNA FRONT END CONTROLLER INTEGRATION

CROSS REFERENCE TO RELATED APPLICATIONS#

Related subject matter is contained in the following co-pending applications:

U.S. application Ser. No. 15/624,518, filed Jun. 15, 2017, entitled "System and Method for Operating a Unified Antenna Front End Module," invented by Suresh Ramasamy et al., and assigned to the assignee hereof.

U.S. application Ser. No. 15/803,571, filed Nov. 3, 2017, entitled "System and Method for Operating an Antenna Adaptation Controller Module," invented by Suresh K. Ramasamy et al., and assigned to the assignee hereof.

FIELD OF THE DISCLOSURE

The present disclosure generally relates to transceiving WWAN and WLAN data streams simultaneously via a plurality of antennas in a mobile information handling system. The present disclosure more specifically relates to decreasing transmission power levels of one or more transmitting antennas based on received trigger inputs indicating operational and/or environmental conditions of the mobile information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include transceiving antennas for communication of cellular, Wi-Fi, GPS and Bluetooth signals.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 3 is a graphical diagram illustrating a dynamic tuning and power reduction truth table according to an embodiment of the present disclosure;

FIG. 4 is a graphical diagram illustrating a dynamic tuning and power reduction truth table according to another embodiment of the present disclosure;

FIG. 5 is a graphical diagram illustrating a dynamic tuning and power reduction truth table according to yet another embodiment of the present disclosure;

The use of the same reference symbols in different drawings may indicate similar or identical items.

DETAILED DESCRIPTION OF THE DRAWINGS

Figure 1:
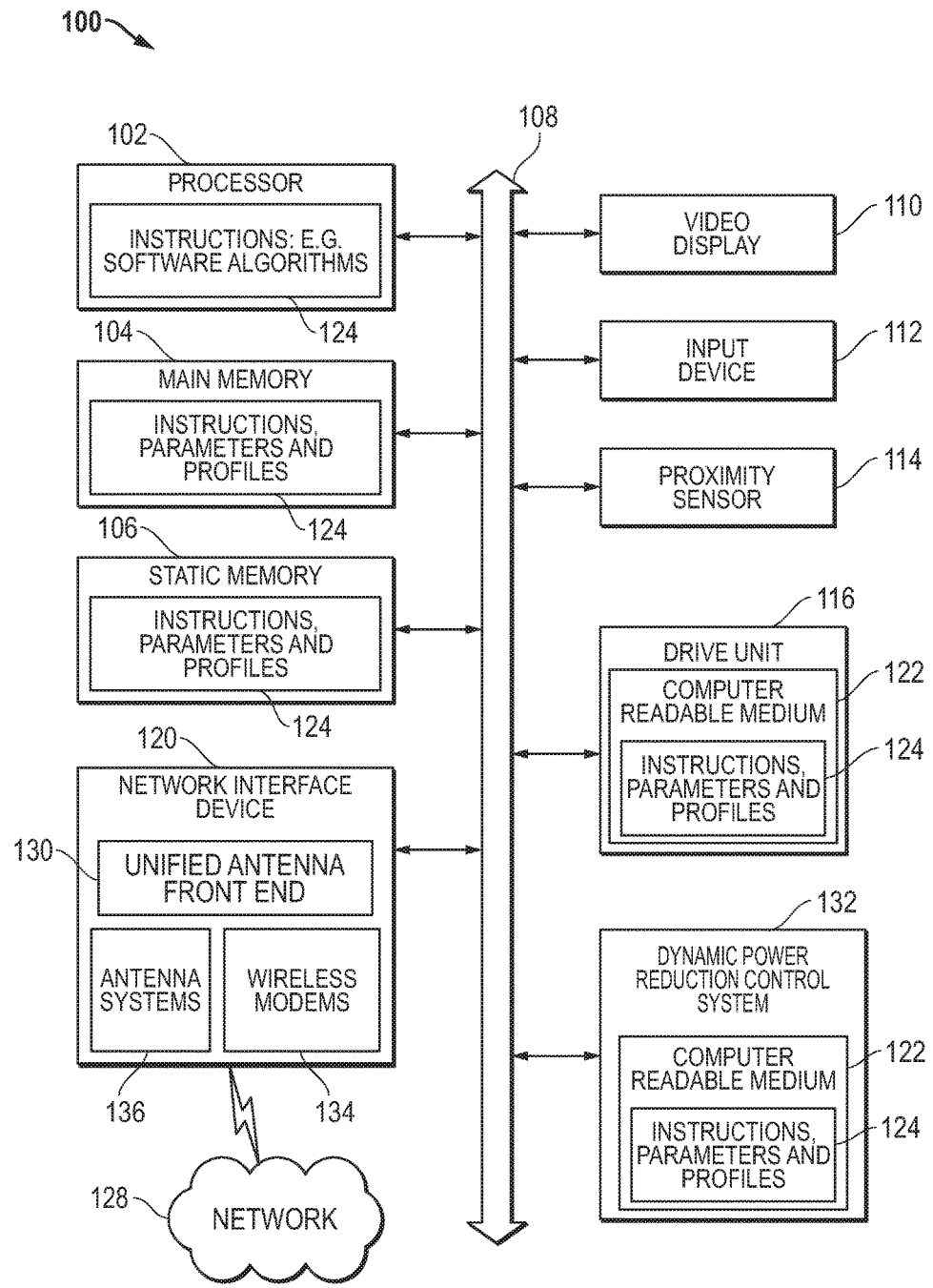
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As mobile computing infrastructure evolves worldwide to enable mobile information handling systems to transmit and receive larger amounts of data more quickly and easily while on the move, the abilities of these mobile information handling systems to receive and transmit various signals simultaneously increase in demand. Mobile information handling systems in embodiments of the present disclosure address this need by employing a plurality of antenna systems for communication via wireless links operating on a variety of radio access technologies (RAT). For example, a mobile information handling system in an embodiment of the present disclosure may employ separate antenna systems for WWAN signals, and WLAN signals. WWAN signals in embodiments of the present disclosure may include 2G standards such as GSM, 2.5G standards such as GSM EDGE and GPRS, 3G standards such as W-CDMA/UMTS and CDMA 2000, 4G standards such as LTE, LTE-A, LTE-LAA, emerging 5G standards, or WiMAX, small cell WWAN, and the like. WLAN signals in embodiments of the present disclosure may include wireless links adhering to standards such as, for example, IEEE 802.11 Wi-Fi, IEEE 802.11ad WiGig, and/or IEEE 802.15 WPAN. In other aspects, several antenna systems may be available for each RAT to enable aggregated data communications such as via plural multiple in, multiple out (MIMO) streams to enhance bandwidth or reliability.

Current configurations involving a plurality of antenna systems operating on a variety of RATs encounter potential problems associated with interference between each of the antennas, compliance with Federal Communications Commission (FCC) standard absorption rate (SAR) requirements across all antennas, and incompatibility between radio modems manufactured by different upstream suppliers. For example, a WWAN modem developed by a first upstream manufacturer may be incompatible or unable to directly communicate with a WLAN modem developed by a second upstream manufacturer. As another example, a WLAN modem developed by a first upstream manufacturer may be incompatible or unable to directly communicate with a cellular LTE modem developed by a second upstream manufacturer. Embodiments of the present disclosure address this issue by providing a unified antenna front end controller capable of directing operations of each antenna system within the mobile information handling system.

Systems capable of directing operations of multiple radio modules not capable of communicating directly with one another in current mobile information handling systems may involve a radio module reading transmission power back off values from BIOS during a stand alone operation, while other the other radio module may be backing off power based on sensor triggers during a stand alone operation involving SAR exposure with no mutual communication. Further during a simultaneous transmission, there is no intelligent means to cut back transmission power in a coherent manner rather than in an ad-hoc manner.

In an interference scenario where transmission harmonic frequencies falling into a reception band thereby desensitizing receiver, current information handling systems rely on filtering available on the receiver chain in the radio front end which only helps mitigate any board level noise. For interference caused over air, there is no intelligent means to alter antenna directivity in current information handling systems. Thus, over the air interference without adaptation of the antennas may impact performance.

Such a configuration is ad-hoc, limited in both scope and functionality and not scalable and may result in sub-par performance. Embodiments of the present disclosure address this issue by employing a microcontroller operably connected to each of the antenna systems to execute instructions of the unified front end controller using signal information from one of the radio modules and antenna system states to control both antenna systems. Antenna system control may include altering directivity and SAR exposure levels, in a synchronous fashion for both or plural antenna systems, using a hardware approach. The unified front end controller may thus eliminate BIOS/OS dependency, resulting in an efficient, enhanced system performance during simultaneous operation.

Operating the plurality of antenna systems within the mobile information handling system in embodiments of the present disclosure further present issues relating to colocation interference between the antennas. Co-location interference issues arise when two antennas transceiving two different signals are placed in close proximity to one another, and the transmission or reception of one of the signals causes extreme interference to the other signal and/or vice versa, such that the quality of one or more of the signals drops. Embodiments of the present disclosure address colocation issues by employing a plurality of methods, including tuning one or both signals to decrease interference, altering the radiation pattern of one or both signals, processing both signals through a network of tunable impedance matching circuits, and/or decreasing the transmitting power of one or both signals.

Further, each of the plurality of antenna systems within the mobile information handling system must be capable of adhering to FCC regulations relating to SAR. The Federal Communications Commission (FCC) regulates the strength of radio frequency signals of WLAN and WWAN antenna systems within a commercial product sold in the United States may emit. Higher strength radio frequency signals may result in stronger signals and better communication, but may also increase the specific absorption rate (SAR), or rate at which energy is absorbed by the human body. The FCC requires WWAN and WLAN antennas within US commercial products to lower the power supplied to the WWAN and/or WLAN antenna systems when an antenna is in close proximity to a human body part in order to avoid any increase in SAR. In order to comply with these requirements, many LTE-compatible devices include proximity sensors that may detect nearby human body parts. The requirement of power reduction depends on hotspot radiofrequency SAR levels detected around the information handling system where a user may come into contact. If a proximity sensor collocated with a transmitting antenna detects a nearby human body part, the mobile information handling systems in embodiments of the present disclosure may decrease the transmitting power of the signal emitted from that antenna in order to simultaneously decrease the SAR levels associated with that antenna.

Current solutions for decreasing transmitting power of a signal undergoing colocation interference or due to a human body part detected nearby a transmitting antenna involve cutting the transmitting power of at least one signal by a single, preset value that may negatively impact the quality of that signal. Essentially, when a decrease in transmitting power is needed, current solutions respond by sacrificing one signal for another. Embodiments of the present disclosure, in contrast, involve decreasing transmitting power of one or more signals by varying degrees, so as to maintain quality of both signals. In other aspects, the unified antenna front end controller of embodiments described herein may employ a dynamic tuning and power reduction control system to alter the transmitting power of one or more signals adaptively, in response to operating condition readings received at preset intervals. In such a way, the unified antenna front end controller in embodiments described herein may adaptively decrease the transmitting power of one or more signals to ensure better battery life, higher signal quality, and higher throughput, while still complying with FCC SAR regulations.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the dynamic tuning and power reduction control system 132, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a video display 110. The video display 110 in an embodiment may function as a liquid crystal display (LCD), an organic light emitting diode (OLED), a flat panel display, a solid state display, or a cathode ray tube (CRT). Additionally, the information handling system 100 may include an alpha numeric input device 112, such as a keyboard, and/or a cursor control device, such as a mouse, touchpad, or gesture or touch screen input, and a GPS location circuit 114 capable of measuring a geographic location in three-dimensions, a velocity, and an acceleration of a mobile, semi-mobile, and/or stationary information handling system. The information handling system 100 can also include a disk drive unit 116.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless adapter 120 may include one or more radio frequency subsystems 130 with transmitter/receiver circuitry, modem circuitry, one or more unified radio frequency front end circuits, one or more wireless controller circuits, amplifiers, antenna systems 136 and other radio frequency subsystem circuitry 130 for wireless communications via multiple radio access technologies. Each radiofrequency subsystem 130 may communicate with one or more wireless technology protocols. The radiofrequency subsystem 130 may contain individual subscriber identity module (SIM) profiles for each technology service provider and their available protocols for subscriber based radio access technologies such as cellular LTE communications. The wireless adapter 120 may also include antenna systems 136 which may be tunable antenna systems for use with the system and methods disclosed herein. Additional antenna system modification circuitry (not shown) may also be included with the wireless interface adapter 120 to implement coexistence control measures as described in various embodiments of the present disclosure.

In some aspects of the present disclosure, one wireless adapter 120 may operate two or more wireless links. In a further aspect, the wireless adapter 120 may operate the two or more wireless links with a single, shared communication frequency band such as with the 5G standard relating to unlicensed wireless spectrum for small cell 5G operation or for unlicensed Wi-Fi WLAN operation in an example aspect. For example, a 5 GHz wireless communication frequency band may be apportioned under the 5G standards for communication on either small cell WWAN wireless link operation or Wi-Fi WLAN operation. In some embodiments, the shared, wireless communication band may be transmitted through one or a plurality of antennas. Other shared communication frequency bands are contemplated for use with the embodiments of the present disclosure as well.

In other aspects, the information handling system 100 operating as a mobile information handling system may operate a plurality of wireless adapters 120 for concurrent radio operation in one or more wireless communication bands. The plurality of wireless adapters 120 may further share a wireless communication band or operate in nearby wireless communication bands in some disclosed embodiments. Further, harmonics and other effects may impact wireless link operation when a plurality of wireless links are operating concurrently as in some of the presently described embodiments. The proximity of concurrent radio transmission or reception in a shared band or interfering bands precipitates a need to assess concurrently operating antenna systems and potentially make antenna system adjustments according to the antenna optimization system of the present disclosure.

The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Wireless adapter 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers which may operate in both license and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band. WWAN may operate in a number of bands, some of which are propriety but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well. In the example embodiment, mobile information handling system 100 includes both unlicensed wireless radio frequency communication capabilities as well as licensed wireless radio frequency communication capabilities. For example, licensed wireless radio frequency communication capabilities may be available via a subscriber carrier wireless service. With the licensed wireless radio frequency communication capability, WWAN RF front end may operate on a licensed WWAN wireless radio with authorization for subscriber access to a wireless service provider on a carrier licensed frequency band.

The wireless adapter 120 can represent an add-in card, wireless network interface module that is integrated with a main board of the information handling system or integrated with another wireless network interface capability, or any combination thereof. In an embodiment the wireless adapter 120 may include one or more radio frequency subsystems 130 including transmitters and wireless controllers for connecting via a multitude of wireless links. In an example embodiment, an information handling system may have an antenna system transmitter 136 for 5G small cell WWAN, Wi-Fi WLAN or WiGig connectivity and one or more additional antenna system transmitters 136 for macro-cellular communication. The radio frequency subsystems 130 include wireless controllers to manage authentication, connectivity, communications, power levels for transmission, buffering, error correction, baseband processing, and other functions of the wireless adapter 120.

The radio frequency subsystems 130 of the wireless adapters may also measure various metrics relating to wireless communication pursuant to operation of an antenna optimization system as in the present disclosure. For example, the wireless controller of a radio frequency subsystem 130 may manage detecting and measuring received signal strength levels, bit error rates, signal to noise ratios, latencies, jitter, and other metrics relating to signal quality and strength. In one embodiment, a wireless controller of a wireless interface adapter 120 may manage one or more radio frequency subsystems 130. The wireless controller also manages transmission power levels which directly affect radio frequency subsystem power consumption as well as transmission power levels from the plurality of antenna systems 136. The transmission power levels from the antenna systems 136 may be relevant to specific absorption rate (SAR) safety limitations for transmitting mobile information handling systems. To control and measure power consumption via a radio frequency subsystem 130, the radio frequency subsystem 130 may control and measure current and voltage power that is directed to operate one or more antenna systems 136.

The wireless network may have a wireless mesh architecture in accordance with mesh networks described by the wireless data communications standards or similar standards in some embodiments but not necessarily in all embodiments. The wireless adapter 120 may also connect to the external network via a WPAN, WLAN, WWAN or similar wireless switched Ethernet connection. The wireless data communication standards set forth protocols for communications and routing via access points, as well as protocols for a variety of other operations. Other operations may include handoff of client devices moving between nodes, self-organizing of routing operations, or self-healing architectures in case of interruption.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions, parameters, and profiles 124 or receives and executes instructions, parameters, and profiles 124 responsive to a propagated signal; so that a device connected to a network 128 can communicate voice, video or data over the network 128. Further, the instructions 124 may be transmitted or received over the network 128 via the network interface device or wireless adapter 120.

Network interface device 120 represents a NIC disposed within information handling system 100, on a main circuit board of the information handling system, integrated onto another component such as processor 102, in another suitable location, or a combination thereof. The network interface device 120 can include another information handling system, a data storage system, another network, a grid management system, another suitable resource, or a combination thereof. Network interface device 120 in an embodiment may operably connect to a network 128. Connection to network 128 may be wired or wireless.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless adapter 120 may include an adaptive massive MIMO Multiplexer 134 with transmitter/receiver circuitry, wireless controller circuitry, amplifiers and other circuitry for wireless communications. The wireless adapter 120 may also include antenna system 136 which may be tunable antenna systems for use with the system and methods disclosed herein. The adaptive massive MIMO multiplexer 134 may include wireless controllers to manage authentication, connectivity, communications, power levels for transmission, buffering, error correction, baseband processing, and other functions of the wireless adapter 120.

The information handling system 100 can include a set of instructions 124 that can be executed to cause the computer system to perform any one or more of the methods or computer based functions disclosed herein. For example, instructions 124 may execute a dynamic tuning and power reduction control system, software agents, or other aspects or components. Various software modules comprising application instructions 124 may be coordinated by an operating system (OS), and/or via an application programming interface (API). An example operating system may include Windows®, Android®, and other OS types known in the art. Example APIs may include Win 32, Core Java API, or Android APIs.

The disk drive unit 116 and the dynamic tuning and power reduction control system 132 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124 including one or more multiplexer configuration scheme tables and/or one or more data stream configuration scheme tables. The disk drive unit 116 and static memory 106 also contain space for data storage. Further, the instructions 124 may embody one or more of the methods or logic as described herein. For example, instructions relating to the dynamic tuning and power reduction control system software algorithms may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the dynamic tuning and power reduction control system may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The dynamic tuning and power reduction control system 132 and the drive unit 116 may include a computer-readable medium 122 such as a magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include a dynamic tuning and power reduction control system 132 that may be operably connected to the bus 108. The dynamic tuning and power reduction control system 132 in an embodiment may reside outside the BIOS of the information handling system 100 and may be executed by the information handling system independently from an operating system directing operation of each antenna system. For example, the dynamic tuning and power reduction control system 132 may be a microcontroller operably connected to each of the antenna systems 136 to execute instructions of the unified front end module 130, thus eliminating the dependency on the operating system. The dynamic tuning and power reduction control system 132 computer readable medium 122 may also contain space for data storage. The dynamic tuning and power reduction control system 132 may perform tasks related to receiving trigger inputs indicating operating or environmental conditions of the information handling system, determining whether and to what extent decreases to Wi-Fi, LTE, WWAN, and/or WLAN signal(s) transmission power is needed based on those trigger inputs, and to which tuning configuration WLAN, WWAN, and/or LTE tuners should be set in order to optimize performance of all currently transceiving signals based on the trigger inputs.

In an embodiment, the dynamic tuning and power reduction control system 132 may communicate with the main memory 104, the processor 102, the video display 110, the alpha-numeric input device 112, the GPS location circuit 114, and the network interface device 120 via bus 108, and several forms of communication may be used, including ACPI, SMBus, a 24 MHZ BFSK-coded transmission channel, or shared memory.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
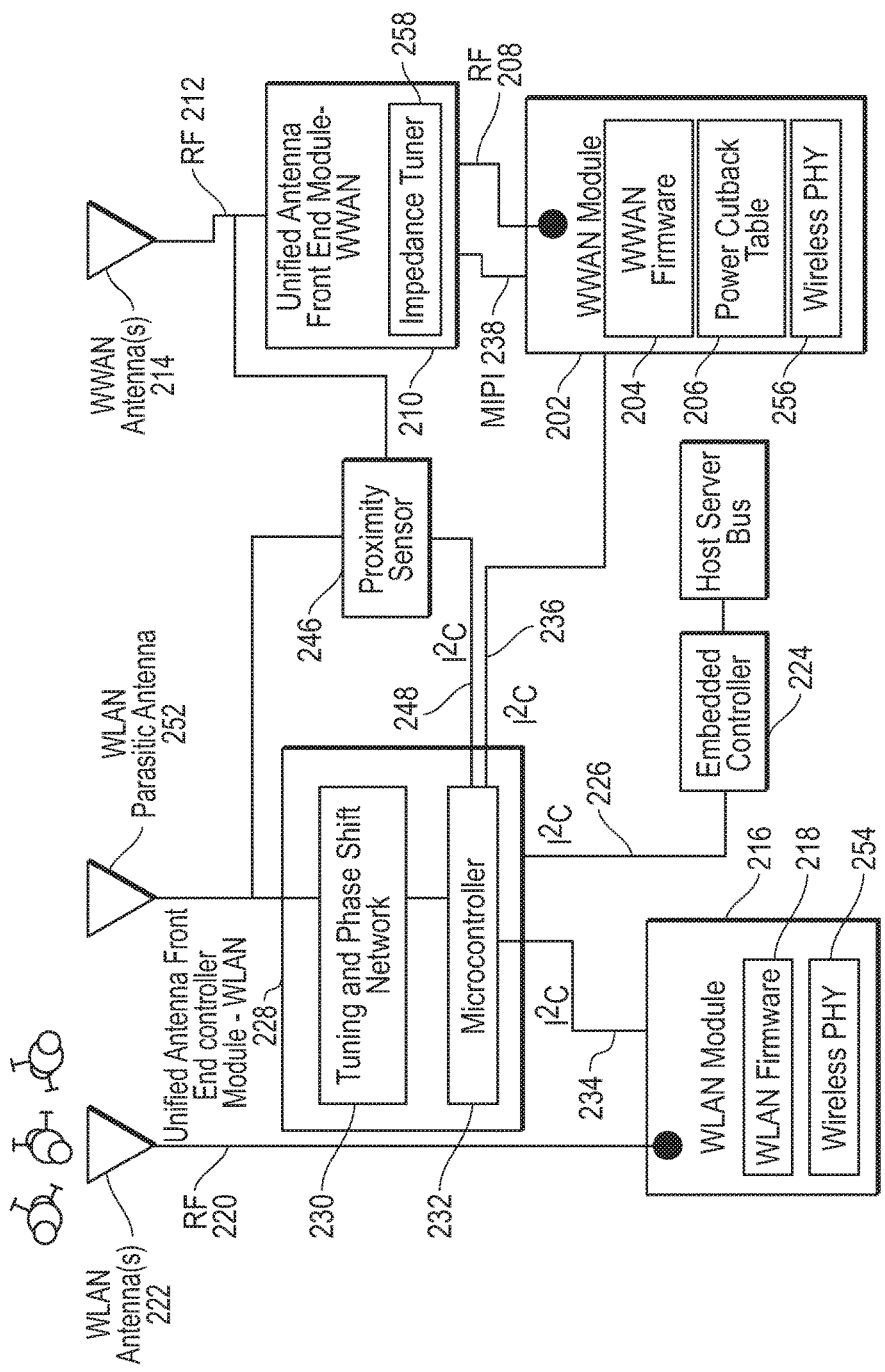
FIG. 2 is a block diagram illustrating an RF antenna front end controller according to an embodiment of the present disclosure.

FIG. 2 is a block diagram illustrating an RF antenna front end that may execute instructions of a dynamic tuning and power reduction control system according to an embodiment of the present disclosure. An information handling system in an embodiment may include one or more RF antenna front ends, and an RF antenna front end may be operably connected to one or more antenna systems and one or more wireless modems. For example, as shown in FIG. 2, an information handling system in an embodiment may include a unified antenna front end module for WLAN 228 (WLAN front end module) operably connected to a WLAN module 216 acting as a wireless WLAN modem, a WLAN antenna 222, and a WLAN parasitic antenna 252. WLAN modules and/or antennas (e.g. 228, 216, 222, and 252) in embodiments of the present disclosure may operate to process and transceive signals including signals adhering to standards such as, for example, IEEE 802.11 Wi-Fi, IEEE 802.11ad WiGig, and/or IEEE 802.15 WPAN. As another example, an information handling system in the same or another embodiment may include a unified antenna front end module for WWAN 210 (WWAN front end module) operably connected to a WWAN module 202 acting as a wireless WWAN modem, and a WWAN antenna 214. WWAN modules and/or antennas (e.g. 202, 210, and 214) in embodiments of the present disclosure may operate to process and transceive signals including signals adhering to 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like.

The WLAN front end controller module 228 and WWAN front end module 210 may work together as part of a wireless network adapter in an embodiment to optimize antenna radiation patterns, tune radio signals, and/or dynamically alter the transmission power of radio signals in order to optimize performance of all transceiving signals and to comply with FCC SAR regulations. In some example embodiments, the WLAN front end controller module 228 may be a Wi-Fi front end module, and the WWAN front end module 210 may be an LTE front end module.

The WWAN front end module 210 in an embodiment may include a tuner 258 which may operate to tune a WWAN radio signal received from the WWAN module 202 via RF data line 208. In some embodiments, the WWAN module 202 may be an LTE module. Impedance or capacitance tuning may be executed in an embodiment to adjust the ratio of impedance to capacitive reactance for one or more antenna systems, and thus adjust RF current coupling between a signal transmitted via the WWAN antenna 214 and a signal transmitted via the WLAN antenna 222 or affecting directionality. In some example embodiments, the WWAN antenna 214 may be an LTE antenna, and the WLAN antenna 222 may be a Wi-Fi antenna. The tuner 258 in an embodiment may tune signals received from the WWAN module 202 via RF data line 208 based upon commands to the tuner 258 via MIPI line 238. Data describing WWAN signal quality may be transmitted from the WWAN module 202 to the WLAN front end controller module 228 and microcontroller 232 via I2C data line 236 in some embodiments for coordination of impedance matching and power reduction measures between the WWAN module 202 and the WLAN module 216. This data. along with WLAN signal quality provided to microcontroller 232, as well as proximity data and embedded controller device state data may be used according to embodiments herein to coordinate WLAN dynamic tuning and power reduction by the unified antenna front end controller module of the WLAN with tuning and power reduction conducted by the WWAN unified front end module 210. The tuner 258 in another example embodiment may tune signals received from an LTE module via RF data line 208 based upon data describing LTE signal quality transmitted from an LTE module to an LTE front end module via GPIO data line 238.

In an example embodiment, a variable capacitor may be used to alter the ratio of impedance to capacitive reactance. In other embodiments, a tuning network, or group of tunable impedance matching circuits may be used to alter the ratio of impedance to capacitive reactance. In yet other embodiments, the tuner 258 may include a plurality of tunable impedance matching circuits operating as an S-CRDN to operably connect or shunt the WLAN signal to the WWAN signal or by shunting between WWAN antennas 222 and 252. By shunting the WLAN signal in such a way, the tuner 258 in such an embodiment may increase rejection to the WWAN antenna 214 operating at a similar frequency to the WLAN antenna 222. For example, if the WLAN antenna 222 is transmitting a signal that is causing co-location interference on a WWAN signal being received by the WWAN antenna 214, the shunting between the transmitting WLAN signal through an S-CRDN within the tuner 258 may remove any co-location interference ringing effects on the received LTE signal. Upon tuning, the tuned RF signal may be transmitted from the WWAN front end module 210 to the WWAN antenna 214 via RF data line 212 for transmission.

In yet other embodiments, the tuning network 258 may include a plurality of tunable impedance matching circuits operating as an S-CRDN to operably connect or shunt a Wi-Fi signal to an LTE signal. Determination and coordination of tunable impedance matching may be made between the WLAN module 216 and the WWAN module via data line 236 connected through the microcontroller 232. By shunting the Wi-Fi signal in such a way, the tuner 210 in such an embodiment may increase rejection to an LTE antenna operating at a similar frequency to a Wi-Fi antenna. Upon tuning, the tuned RF signal may be transmitted from an LTE front end module to an LTE antenna via RF data line 212 for transmission.

In the embodiment shown in FIG. 2 for illustration, a WLAN antenna 222 is shown working with a WLAN radio module 216. In an example aspect, the RF antenna front end 228 may include a microcontroller 232 which may operate a dynamic tuning and power reduction control system to select an optimized antenna radiation pattern, tune a radio signal, or dynamically decrease transmission power of one or more radio modules in response to antenna trigger inputs including WLAN or WWAN radio performance inputs. In other aspects, the microcontroller 232 may be a separate microprocessor or may be integrated into another portion of a wireless adapter such as that shown herein for an information handling system. For example, in some aspects, the microcontroller 232 may be integrated into one or more wireless radio modules such as the WLAN module 216. As another example, in some aspects, the microcontroller 232 may be integrated into a WLAN front end controller module 228 in some embodiments or a WWAN front end controller module 210 in other embodiments. In yet other aspects, some or all of the operations of the microcontroller 232 may be distributed across microprocessing capabilities embedded within several portions of the wireless adapter of an information handling system. In this way, the operation of the microcontroller 232 may be operating system independent when optimizing a WLAN and/or WWAN antenna configuration.

The WLAN front end module may further be operably connected to a capacitive or other proximity sensor 246 via an I²C line 248. The proximity sensor 246 may further be operably connected to a WWAN antenna 214 and/or a WLAN parasitic antenna 252 in order to receive indications that a human body part is in close proximity with the WWAN antenna 214 and/or the WLAN parasitic antenna 252, respectively. In other embodiments, the proximity sensor 246 may be operably connected to a Wi-Fi front end module via I²C line 248, and to an LTE antenna and/or a Wi-Fi parasitic antenna. Capacitive or other proximity sensor data received by 246 and provided to the microcontroller 232 may serve as an example antenna trigger for which consideration of antenna performance is assessed when determining an optimal configuration of tuning, antenna radiation pattern, and/or transmission power reduction needed to maintain connectivity quality levels or exposure level limits. The capacitive or other proximity sensing element 246 may detect a user touching or otherwise nearby a sensor located on the information handling system. A detected change in capacitance or other proximity indication may be sent back to the microcontroller 232 to indicate that a user may be within a distance range of a transmitter or transceiving antenna system such that specific absorption rate (SAR) safety standards require a reduction in transmission power to avoid exposure levels of RF radiated energy to a user of the information handling system. It is understood that a proximity sensor may be any of a variety of types including capacitive, infrared, touch screen, visual light, infrared, or other sensor to detect the proximity of a user to an information handling system. Additionally, in various embodiments, the proximity sensor may be located anywhere on the information handling system. In some particular embodiments, a proximity sensor may be located adjacent to or otherwise nearby to one or more antenna systems, such as WLAN antenna 222, WWWAN antenna 214, a Wi-Fi antenna, and/or an LTE antenna on the information handling system.

In some embodiments, antenna systems of the information handling system may include a WLAN parasitic antenna 252 which may permit control over the antenna radiation pattern of the WLAN antenna 222. Similar parasitic element interfaces may be used to control radiation patterns for WWAN antennas as applicable. A microcontroller 232 may provide for control over phase shifting the coupling currents to the WLAN parasitic antenna 252. Activation of increased phase shift to the WLAN parasitic antenna 252 or decreased phase shift of other parasitic elements or other transmitting device may be used to steer an antenna transmission pattern by the WLAN front end module 228 operating the tuning and phase shift network 230 in various embodiments. For example, the WLAN antenna 222 may be embedded in a metal chassis such as a display screen housing or base housing for an information handling system. Some or all of a metallic chassis, hinge, bezel, or other structural component of the information handling system may act as the WLAN parasitic antenna 252, providing RF radiation with phase shift for transceiving WLAN signals. The WLAN parasitic antenna 252 may be used by the tuning and phase shift network 230 to direct phase shift such that these parasitic elements may influence the current, thereby steering the shape of the RF antenna pattern for the WLAN antenna 222. It is understood that any number of WLAN antennas may be deployed with the WLAN front end module 228 or by the information handling system in other embodiments although the present embodiment describes one WLAN antenna system. Similarly, it is understood that the above discussion may be applied to WWAN antennas, Wi-Fi antennas, and/or LTE antennas in other embodiments.

In an example embodiment of antenna steering control implemented via the tuning and phase shift network 230, impedance or capacitance tuning may be executed to adjust the ratio of impedance to capacitive reactance for one or more antenna systems to adjust phase shift of RF current coupling to influence directivity patterns for the WLAN antenna 222 or any other WLAN antenna systems deployed in an information handling system. In an example embodiment, a variable capacitor may be used to alter the ratio of impedance to capacitive reactance. For example, a WLAN 2.4 or 5 GHz transmitting antenna 222 operating several parasitic antenna elements may decrease rejection between the WLAN antenna 222 and the WWAN antenna 214. This may occur, for example, through antenna radiated pattern coupling paths through the WLAN parasitic antenna 252 to alter the antenna pattern or direction of the WLAN 2.4 or 5 GHz transmitter antenna system 222. The tuning and phase shift network 230 of the present embodiment may implement pattern decorrelation by finding the radiation pattern pair between the main and auxiliary antenna ports with orthogonal directivity that enhances the RSSI, SNR or other signal quality indication using the firmware or other algorithms of the tuning and phase shift network 230. By using a parasitic coupling element with a variable impedance termination and which may be triggered by a switch, the system may control the directionality of the transmission signal to thereby cause a shift of transmission pattern. The tuning and phase shift network 230 may control this tuning for the antenna ports for the WLAN antenna 222 to alter RF transmission pattern and potentially improve RSSI, SNR, MCS or other performance factors. Again, control over phase shift and impedance match tuning by tuning and phase shift network 230 of the WLAN unified front end controller module 228 may be conducted in coordination by the microcontroller 232 receiving data relating to changes occurring at the WWAN unified front end module 210 and WWAN radio module 202. Coordination of antenna patterns may be registered based on known antenna positions and operation of WLAN antennas 222 and 252 as well as co-located WWAN antenna 214. Selection may be made via a dynamic tuning and power reduction truth table accessed by microcontroller 232 in connection with device state data from embedded controller 224 and proximity data from sensor 246.

In yet another example embodiment of coexistence control implemented via the WLAN unified RF antenna front end 228, by altering or cancelling out the antenna port to port coupling between antenna ports, this may enhance rejection between ports of the plurality of antenna systems concurrently operating. For example during concurrent operation, such as a hotspot, if the WLAN antenna 222 is transmitting at 5 GHz concurrently with the co-located WWAN antenna 214, the tuning and phase shift network 230 could desense the WWAN antenna 214 port to port coupling as well. A WLAN unified RF antenna front end 228 of the present embodiment may have a tunable decoupling network comprising a transmission line at the input of each antenna port to convert the trans-admittance between ports to more of a reactance. This, followed by a tunable reactive component in shunt between the transmission lines to cancel out the reactance between the concurrent antenna ports may create an open circuit (OL) at the frequency of operation. This control may result in an improved rejection of interference between the antenna ports.

Additionally, RF pattern shape control may be implemented in some embodiments by tuning for advanced open loop using feedback (AOL) or closed loop using power detection (CL) circuit. Antenna port termination or tuning may be altered to enhance transmission pattern diversity. In another aspect, one of the antenna port terminations or tuning may be altered to increase reflection to increase interference rejection for one or other portions of the WLAN antenna 222 or the WLAN parasitic antenna 252. Further the OL, AOL and CL may be tuned at an antenna port termination to reduce output power to meet SAR body exposure limitations. A tuning and phase shift network 230 may use a tunable capacitor integrated circuit to alter the antenna port termination and tune in response to antenna triggers processed by the microcontroller 232 such as from a proximity sensor 246. The microcontroller 232 or the tuning and phase shift network 230 may use antenna trigger feedback data to conduct the advanced open loop (AOL) tuning operations in aspects of the embodiment herein.

In another example embodiment of RF shape pattern control, phase shift using aperture tuning may shift the WLAN antenna's 222 directivity in that radiofrequency radiation may be directed to occur at a greater proportion on the WLAN antenna 222 or at a greater level on one or more WLAN parasitic antennas 252 or other parasitic elements such as the antenna system board, traces, or chassis of the information handling system which may participate in radio frequency transmission and reception. Radiation pattern may be coupled into system board, traces which may introduce or increase noise floor which may impact the RSSI, SNR, MCS or other signal quality indications. Degradation of the RSSI or other metrics detected by the microcontroller 232 will be used to move antenna pattern directivity away from the system board to enhance RSSI and other link performance metrics thereby achieving a closed loop power control and pattern adaptation.

In yet another example embodiment of RF shape pattern control, selection of open circuit, advanced open circuit, or a closed loop may be implemented or activated by the microcontroller 232 to alter RF transmission shape patterns. Referring to AOL (Advance open loop using feedback) or CL (Closed loop using RSSI and other metrics detected form a wireless adapter) tuning, either antenna port termination or tuning may be altered to improve or enhance pattern diversity or to increase reflection to increase rejection and decrease output power to meet SAR exposure limits. A tuning and phase shift network 230 may use a tunable capacitor integrated circuit, in conjunction with the WLAN parasitic antenna 252, to alter the WLAN antenna 222 port termination, tuning, phase shift, or any combination based on the control from the microcontroller 232 in response to antenna trigger data. For example, the microcontroller 232 may thereby conduct advanced open loop tuning using feedback from P-Sensor 246 or other sensor inputs to change pattern directivity or antenna tuning using impedance and aperture tuning techniques.

The WLAN antenna 222 RF shape pattern adjustments may include modification of only one WLAN antenna, or any or all WLAN antennas in operation according to embodiments described herein. Examples of antenna configuration modifications that may be implemented as RF shape pattern control include tuning at the antenna ports with varying impedance terminations to alter the phase shift of coupling currents and directionality of a particular antenna system, or decoupling networks activated between multiple WLAN antenna ports, or between a WLAN antenna port and a WWAN antenna port operating concurrently to enhance rejection of signals between the ports. Combination of the RF shape pattern controls may be utilized including these examples or any combination by the tuning and phase shift network 230 in connection with the microcontroller 232 and WLAN radio module 216 or WWAN module 202. Further, additional antenna control measures may be employed including turning off or turning down power to some antenna systems and using alternative options such as between parallel wireless links from a MIMO set of wireless links with several parallel data streams on wireless connections.

The microcontroller 232 further may communicate with a variety of additional antenna trigger data sources. For example, the microcontroller 232 may be connected to receive usage mode physical configuration data from an embedded controller (EC) 224. EC 224 may detect the orientation and configuration of an information handling system and the relative position and orientation of the one or more antenna systems, such as 222 and 214, relative to the physical configuration of the information handling system. EC 224 may work in connection with a sensor hub connected to various motion sensors, orientation sensors, and position sensors to detect the relative physical configuration and orientation of portions of the information handling system relative to other portions of the configurable information handling system. Example sensors may include accelerometers, digital gyroscopes, hinge angle detectors, and other orientation sensors. In an example embodiment, the orientation sensors may be coordinated with the EC 224 via a processor which may also be operatively coupled to the WLAN antenna front end controller module 228 in a wireless adapter of the information handling system via a bus to permit communication of data wirelessly transceived via the WLAN antenna front end controller module 228 and WLAN radio module 216. In other example embodiments, the orientation sensors may be coordinated with the EC 224 via a processor which may also be operatively coupled to a Wi-Fi antenna front end module in a wireless adapter of the information handling system via a bus to permit communication of data wirelessly transceived via a Wi-Fi antenna front end module and Wi-Fi radio module 216.

Orientation sensors may provide sensor data that serves as all or part of some of the inputs to EC 224 described. EC 224 may gather sets of data from some or all of a variety of orientation sensors, proximity sensors, docking sensors or the like as shown for use with a variety of usage modes for various physical configurations. A sensor hub may be located within wireless interface adapter or elsewhere on the motherboard of the information handling system (not shown). Orientation sensor types include motion sensors and other sensors including one or more digital gyroscopes, accelerometers, and magnetometers. Motion sensors may also include reference point sensors. For example, a geomagnetic field sensor may determine position of a display screen relative to a keyboard of a laptop or a 360 degree convertible device. This positional information may provide x-axis, y-axis, and z-axis positional information of the information handling system relative to magnetic north pole, and there for a reference point of the device position. In one embodiment, two geomagnetic field sensors provide x-axis, y-axis, and z-axis positional information for a keyboard and display screen or for each display screen housing of a dual display housing information handling system according to various embodiments herein. With sensor data from any of several combinations of the above sensors, the system determines the relative position of the two housings to one another in orientation, such as two display screen housings or a display screen and keyboard housing.

Also, a digital gyro and accelerometer may be used to detect motion and changes in position. These sensors may provide a matrix of data. In an example embodiment, the azimuth or yaw, pitch, and roll values of the device are indicated by the raw sensor data. The orientation data may be relevant to relative locations of antennas with an information handling system such as those located in different hinged portions in one embodiment. In connection with a reference point, such magnetic north as provided in one embodiment by a geomagnetic field sensor, the azimuth can be determined as a degree of rotation around a z-axis. Further hinge azimuth angle may be discussed further below. In an embodiment, the azimuth may be the value of the z-axis relative to the device y-axis as positive angle values between 0° and 360°. It is understood that a different range of values may be assigned in different embodiments of a laptop, 360 degree convertible device, or even a tablet computing system which may have a plurality of display screens or a single, foldable display screen across two housings.

Based on a reference point such as provided by a geomagnetic field sensor, pitch may be determined as a degree of rotation around the x axis. In an example embodiment, the angle values may range from positive 180° to negative 180° relative to the y-axis, although other value ranges may be assigned instead. Roll is also based on the reference value, for example that established by a geomagnetic sensor. Roll may be considered to be rotation about the y-axis and its values may range from positive 90° to negative 90°. Again, the value ranges assigned can vary for each of the azimuth, pitch, and roll as long as a set of values is used to define orientation parameters in three dimensional space.

The orientation sensor data may be processed partly by a sensor hub or accumulator, which may be EC 224, to provide orientation data for the information handling system. The sensor hub performs a fusion of data signals received from either a single sensor or multiple sensor devices. In one example embodiment, the sensor hub is an independent microcontroller such as the STMicro Sensor Fusion MCU.

The sensor data may further include proximity sensors or capacitive touch sensors, such as proximity sensor 246. For example, touch or hover sensors may detect when a screen is actively being used. Further, proximity sensor 246, for example a capacitive sensor, may detect the location of a user relative to various parts of the information handling system and antennas located nearby such for the microcontroller 232. Proximity sensor 246 located on one or more display screens or a keyboard may detect the position of a user body part such as a hand, lap, arm, torso or the like) around information handling system (for example, directly in front, above, below, to the right, or to the left of the plane of the display screen or the keyboard) and thus determine required SAR levels based on the position of the user or users.

In an example embodiment, the information handling system may be a convertible laptop which may be operated in a plurality of usage mode configurations. The convertible laptop may include a plurality of housings connected by a hinge which may be oriented in a variety of ways with respect to one another or in space relative to a user. EC 224 may be used to detect a usage mode for a physical configuration of the convertible laptop in an example embodiment. For example, a laptop usage mode may include a display in one housing and a keyboard in another housing. Physical configurations may include a laptop mode whereby the display is viewable above the keyboard in a traditional laptop configuration in one example embodiment. In another physical configuration embodiment, the display may be folded around to lay flat and adjacent to the housing of the keyboard such that a laptop physical configuration may be detected for the display housing relative to the keyboard housing. Additionally, the physical usage mode configuration of the convertible laptop information handling system may also have impact on the orientation and location of antennas and antenna transmission patterns for the one or more WLAN antennas 222 and/or WWAN antennas 214. In an example embodiment, an EC 224 may detect laptop mode physical configuration and assign a value of 1 while a detected tablet mode may be assigned a configuration value of 0. It is understood that any value may be assigned such that EC 224 may indicate laptop mode and tablet mode in example embodiments.

EC 224 may be connected to microcontroller 232 via a data bus for reporting physical configuration data for various usage modes detected. In one example embodiment, microcontroller 232 may maintain a master-slave relationship with antenna trigger input data sources. Microcontroller 232 may poll antenna trigger input data from the proximity sensor 246 via I$^2$C data line 248, from the WWAN module 202 via I$^2$C data line 236, from the WLAN module 216 via I$^2$C data line 234, and from the EC 224 via I$^2$C data line 226. The antenna trigger data providers (e.g. EC 224, WWAN module 202, WLAN module 216, and proximity sensor 246) may respond to polling queries from the microcontroller 232 with reports related to measurements or status determinations. Further, antenna trigger data provider slave devices such as the proximity sensor 246, EC 224, WLAN module 216, WWAN module 202, RFICs in the wireless adapter, or other antenna trigger data providers may also obtain attention of the microcontroller 232 via GPIO interrupt operation along the same or different communication lines in some embodiments. Upon an event, an interrupt signal to the microcontroller 232 may cause the microcontroller 232 to configure the data lines to operate as an I²C communication line and query the slave antenna trigger data device to provide the event information.

In one example embodiment, an I²C line may be used as communication line 234 to report WLAN signal condition data such as received signal strength (RSSI), signal to noise ratio (SNR), modulation coding scheme index (MCS), bit error rates (BER), transmission power levels, reception power levels, TX/RX status, data packet volumes and other data reported by the WLAN radio module 216 to the microcontroller 232. In another example embodiment, an I²C line may be used as communication line 234 to report WWAN signal condition data such as received signal strength (RSSI), signal to noise ratio (SNR), bit error rates (BER), transmission power levels, reception power levels, TX/RX status, data packet volumes and other data reported by the WWAN radio module 202 to the microcontroller 232. Further, the microcontroller 232 or other aspects of the WLAN antenna front end controller module 228 may provide notification of operations to switch between the WLAN antenna 222 and an auxiliary WLAN antenna or to provide power cutback requirements to the WLAN module 216 or the WWAN module 202 depending on the antenna trigger inputs received by the microcontroller 232. Control or notification data from the microcontroller 232 or WLAN antenna front end controller module 228 may be transmitted along communication line 234 to the WLAN module 216 or along communication line 236 to the WWAN module 202. Detection of WLAN signal conditions and receipt of control or notification commands or data from the microcontroller 232 may be processed by the WLAN radio module 216 in the firmware layer 218 and may be executed in the physical layer 254. WLAN radio module 216 may command power levels or data operations with the WLAN antenna 222 via RF line 220. Detection of WWAN signal conditions and receipt of control or notification commands or data from the microcontroller 232 may be processed by the WWAN radio module 202 in the firmware layer 204 and may be executed in the physical layer 256. WWAN radio module 202 may command power levels or data operations with the WWAN antenna 214 via RF line 208.

In yet another aspect, the WLAN antenna front end 228 also may accommodate SAR safety requirements while selecting an optimal WLAN antenna configuration among the plural antenna systems operating concurrently on the information handling system. Concurrent antenna operation may be with MIMO or other aggregation connectivity through plural WLAN or WWAN antennas on the information handling system. Adjustments for improved WLAN antenna performance between concurrently operating WLAN antennas, and/or improved overall wireless performance between a WLAN antenna operating concurrently with a co-located WWAN antenna may also yield load shifting among the multiple wireless data streams to enhance utilization of WLAN signals and WWAN signals with the best radio conditions and performance.

Upon receiving one or more trigger inputs as described herein, the microcontroller 232 in an embodiment may access a power cutback table 206 stored within the WWAN module 202 via the I²C data line 236 in an embodiment. The power cutback table 206 may include a dynamic tuning and power reduction truth table describing an optimized configuration for all Wi-Fi and LTE modules in an embodiment. For example, the microcontroller 232 in an embodiment may receive a plurality of trigger inputs describing signal quality parameters for each transceiving signal, detection of nearby human body parts, positional orientation of the information handling system, and current usage mode of the information handling system. The microcontroller 232 in an embodiment may then access the power cutback table 206 within the WWAN module 202 in order to determine the optimal configuration associated with the received trigger inputs, including identification of any decreases in transmission power needed for each of the signals, and/or an optimal tuning or antenna pattern adaptation scheme for the WLAN signal(s).

The WLAN antenna front end controller module 228 may include a microcontroller 232 that may access a dynamic tuning and power cutback table stored in a memory of the WLAN module 216 while a WWAN cutback table 206 may be utilized for WWAN cutback by the WWAN module 202. In other embodiments, a dynamic tuning and power cutback table may be stored in the WLAN module 216 or at the WLAN unified antenna front end controller module 228 in various embodiments. The WLAN antenna front end controller 228 may also interface with one or more tuners for interfacing directly or via a tuner systems with a plurality of antenna systems such as main WLAN antenna 222 and auxiliary WLAN antenna 252 or similar WWAN antennas. In various example embodiments, any plurality of Wi-Fi antennas may be mounted and operational on the information handling system in which RF front end controller 228 and front end 258 is installed and which may operate similarly with one or more antenna adaptation controllers 232 for coordination between the WLAN and WWAN dynamic tuning and power reduction measure taken for interference reduction or SAR regulatory purposes.

Antenna systems, such as WLAN antenna 222 and/or WWAN antenna 214, may be a variety of antenna systems that are mounted within the information handling system or may utilize peripheral antenna systems connected to the WLAN antenna front end 228 or the WWAN antenna front end 210. In some example embodiments, antenna systems 222 and 214 may utilize an antenna device installed on an information handling system with a primary dipole radiator or antenna aperture for each of 222 and 214. In other embodiments, antenna systems 222 and 214 may also incorporate RF radiator surfaces such as portions of the information handling system chassis, motherboard, wiring/traces, or case components as aspects of the antenna systems 222 and 214. Some of these RF radiation effects may not be intentional. In yet other example embodiments, antenna systems 222 and 214 may utilize auxiliary devices such as cords or cabling external to the information handling system. Various embodiments of the unified antenna front end module(s) shown in FIG. 2 are contemplated.

FIG. 3 is a graphical diagram illustrating a WWWAN power cut back portion of a dynamic tuning and power reduction truth table according to an embodiment of the present disclosure. A dynamic tuning and power reduction truth table in an embodiment may associate one or more microcontroller input triggers with an optimal power reduction configuration for a WLAN wireless link currently transmitting from one or more WLAN antennas. Although FIG. 3 illustrates only the WLAN power cut back table portion of the dynamic tuning and power reduction truth table, the WLAN power cut back portion of the dynamic tuning and power reduction truth table described with reference to FIG. 3, the WWAN power cut back portion of the dynamic tuning and power reduction truth table described with reference to FIG. 4, and the WWAN tune code portion of the dynamic tuning and power reduction truth table described with reference to FIG. 5 may be combined into a single dynamic tuning and power reduction truth table in some embodiments. The dynamic tuning and power reduction truth table 302, or any portion thereof, may be stored in a memory within a WLAN module, a WWAN module, or more specifically, within a Wi-Fi module or an LTE module. The microcontroller in an embodiment may be capable of accessing the dynamic tuning and power reduction truth table stored in any of these memory locations without the involvement of the operating system of the information handling system.

As shown in FIG. 3, the WLAN power cut back portion of the dynamic tuning and power reduction truth table 302 may associate one or microcontroller input triggers 310 with one or more power reduction values 312 to be applied to the signal transmitted from a WLAN module. The input triggers 310 may include an indication of the current radiation pattern for one or more WLAN antennas, link quality values for one or more concurrently transmitting and/or receiving wireless links (Tx/Rx Info), proximity sensor (P-sensor) input, and one or more input triggers received from an embedded chip operably connected to the microcontroller. Each of these trigger inputs in an embodiment may have a number value. For example, in an example embodiment in which four antennas are capable of transmitting signals, the TX/RX info trigger input and P-sensor trigger inputs may have a value between one and four, identifying one of the transmitting antennas of the information handling system. In such an embodiment, the TX/RX info trigger may identify the transmitting antenna currently transmitting an aggressor signal that is causing colocation interference on another antenna. In another aspect of such an embodiment, the P-sensor trigger input may identify the transmitting antenna co-located with the proximity sensor that has detected a nearby human body part. In yet another aspect of such an embodiment, two antennas may be located nearby a single proximity sensor such that a P-sensor value of one may indicate a human body part detected nearby both antennas. TX/RX info trigger inputs and P-sensor trigger inputs having a value of zero in such an embodiment may, for example, indicate no colocation interference or no detected human body part. Other embodiments may include any number of transmitting antennas, and thus, the TX/RX info trigger input and P-sensor trigger input may have a number value correlating to the number of transmitting antennas.

In another example embodiment in which the WLAN front end module is capable of transmitting WLAN signals according to four different antenna patterns, the antenna radiation pattern trigger input may have a value between one and four, identifying one of the antenna radiation patterns currently in use. WLAN antenna radiation patterns having a value of zero in such embodiments may indicate no WLAN signal is currently being transmitted. Other embodiments may include any number of different antenna radiation patterns and may thus have any number of numeric values. In still other embodiments, a Wi-Fi module may be capable of transmitting Wi-Fi signals according to differing antenna patterns and the WLAN antenna radiation pattern may identify the antenna radiation pattern currently in use by a Wi-Fi antenna.

In another example embodiment in which the information handling system may operate according to a plurality of configurations, the embedded chip trigger input may identify the configuration in which the information handling system is currently operating. For example, an information handling system may be capable of operating according to an open, closed, and/or tablet configuration. In such an example embodiment, each of these configurations may be assigned a number value ranging from zero to two. In other embodiments, any number of configurations may be used, and thus, the embedded chip trigger input may be associated with a number value correlating to the number of configurations available.

Trigger input data providers such as the WLAN module and/or Wi-Fi module in an embodiment may respond to polling from the microcontroller with reports related to measurements or status determinations. Further, antenna trigger data provider slave devices may also obtain attention of the microcontroller via GPIO interrupt operation along the same or different communication lines as the I²C data lines connecting these devices in some embodiments. Upon an event, an interrupt signal transmitted to microcontroller may cause the microcontroller to configure the data lines to operate as an I²C communication line and query the slave antenna trigger data device to provide the event information.

The truth table 302 may identify an optimal power reduction configuration for the signal being transmitted via a WLAN antenna for the operating scenario described by any possible combination of received trigger inputs. For example, the truth table 302 as shown in FIG. 3 illustrates two different operating scenarios. The input triggers shown in row 304 indicate the WLAN antenna is operating according to a first antenna radiation pattern. The TX/RX trigger input of row 304 has been assigned a value of 1 indicating the existence of colocation interference between concurrently transmitted signals with the signal transmitted by a first antenna acting as the aggressor signal. The proximity sensor trigger input of row 304 has been assigned a value of 1 indicating detection of a human body part nearby a first antenna. The first antenna in an example embodiment may be a WLAN antenna. The embedded chip trigger input of row 304 has been assigned a value of 1 indicating the information handling system is operating according to a first orientation (e.g. laptop, closed, or tablet configuration).

As another example, the input triggers shown in row 306 include a WLAN antenna radiation pattern having a value of 2, a TX/RX input trigger having a value of 1, a P-sensor trigger input having a value of zero, and an embedded chip input trigger having a value of 1. Thus, the trigger inputs of row 306 may vary from row 304 in that the P-sensor trigger input of row 304 has a value of one, indicating a human body part detected nearby a first transmitting antenna, and the P-sensor trigger input of row 306 has a value of zero, indicating no detected nearby human body part. Further, the trigger inputs of row 306 may vary from row 304 in that the WLAN antenna is transmitting according to a first antenna radiation pattern in the scenario described with reference to row 304 and the WLAN antenna is transmitting according to a second antenna radiation pattern in the scenario described with reference to row 306.

The truth table 302 may identify an optimal power reduction configuration as shown in columns 312 for the signal being transmitted via a WLAN antenna for the operating scenario described by any possible combination of received trigger inputs (e.g. inputs in row 304-306). The optimal power reduction configuration associated with each combination of trigger inputs may further depend on the band in which the WLAN signal is currently being transmitted. For example, as shown in columns 312, differing power reduction values are assigned to the same combination of trigger inputs based on whether the WLAN signal is currently being transmitted or received in the 2.4 GHz low-frequency (L) band, the 2.4 GHz mid-frequency (M) band, the 2.4 GHz high-frequency (H) band, the 5 GHz low-frequency (L) band, the 5 GHz mid-frequency (M) band, tor the 5 GHz high-frequency (H) band. In other embodiments, the truth table may identify an optimal power reduction configuration for the signal being transmitted via Wi-Fi for the operating scenario described by any possible combination of received trigger inputs. In such embodiments, the optimal power reduction configuration associated with each combination of trigger inputs may further depend on the band in which the Wi-Fi signal is being transmitted, similarly to the WLAN example.

In an example embodiment, if the WLAN antenna is radiating according to a first pattern and the proximity sensor has detected a human body part nearby the WLAN antenna transmitting the WLAN signal, as shown in row 304 of truth table 302, the optimal power reduction configuration may include reducing the transmission power of the WLAN signal by 2 dB if the signal is being transmitted in the 2.4 GHz low-frequency (L) band, by 3 dB if the signal is being transmitted in the 2.4 GHz mid-frequency (M) band, by 1 dB if the signal is being transmitted in the 2.4 GHz high-frequency (H) band, or by 3 dB if the signal is being transmitted in any of the 5 GHz bands. In another embodiment, the proximity sensor may be placed nearby both a WLAN antenna and a WWAN antenna such that a P-sensor trigger input having a value of one may indicate a human body part detected nearby both the WLAN antenna and the WWAN antenna.

In another example embodiment, if the WLAN antenna is radiating according to a second pattern and the proximity sensor has not detected a human body part nearby the WLAN antenna transmitting the WLAN signal, as shown in row 306 of truth table 302, the optimal power reduction configuration may include a different reduction in WLAN transmitting signal power than the scenario described with reference to row 304. For example, the trigger inputs of row 306 may indicate a TX/RX trigger input having a value of one, indicating co-location interference is being caused by an aggressor signal transmitting from the WWAN antenna (or LTE antenna in other embodiments). In such a scenario, the truth table 302 may associate this combination of trigger inputs with no reduction in the transmission power of the WLAN signal, regardless of the band in which the WLAN antenna is transmitting the signal. This may be the case because the WLAN signal is not the aggressor signal, and thus, no reduction in power supplied to the WLAN signal is needed.

FIG. 4 is a graphical diagram illustrating a WWAN power cut back portion of a dynamic tuning and power reduction truth table according to an embodiment of the present disclosure. A dynamic tuning and power reduction truth table in an embodiment may associate one or more microcontroller input triggers with an optimal power reduction configuration for a WWAN wireless link currently transmitting from one or more WWAN antennas. As shown in FIG. 4, the WWAN power cut back portion of the dynamic tuning and power reduction truth table 402 may associate one or more microcontroller input triggers 310 with one or more power reduction values 404 to be applied to the signal transmitted from a WWAN module.

The optimal power reduction configuration associated with each combination of trigger inputs may further depend on the band in which the WWAN signal is currently being transmitted. For example, as shown in columns 404, differing power reduction values are assigned to the same combination of trigger inputs based on whether the WWAN signal is currently being transmitted or received in the low-frequency (L) band, the mid-frequency (M) band, or the high-frequency (H) band. Further, the optimal power reduction configuration may include different power reduction values for different antennas. For example, the WWAN signal may be transmitted via multiple antennas according to a multiple-input-multiple-output (MIMO) scheme. In such a scenario, the WWAN module may have a first port connected to the first WWAN antenna for transmission of a first WWAN signal at a first power level and a second port connected to the second WWAN antenna for transmission of a second WWAN signal at a second power level. The first and second power levels may not be equivalent in an embodiment. Further, the microcontroller in such an embodiment may be operably connected to the first port via a first microcontroller port/pin and to the second port via a second microcontroller port/pin. By transmitting instructions to the first port and the second port separately, via the two separate microcontroller port/pins, the microcontroller may effectively control the transmitting power of the two WWAN signals independently from one another.

Further, the optimal power reduction configuration in an embodiment may include differing power reduction values for each of the separate WWAN signals. For example, as shown in row 304, the optimal power reduction configuration may include reducing the transmission power of a first WWAN signal being transmitted according to the LTE Band 7 (B7) by 3 dB if the signal is being transmitted in the low-frequency (L) band, mid-frequency (M) band, or high-frequency (H) band. However, the optimal power reduction configuration for a second WWAN signal being transmitted according to the LTE Band 46 may not include any power reductions, regardless of the transmitting band. The LTE Band 7 may operate at a center frequency of 2.6 GHz (e.g. 2.5 GHz to 2.57 GHz upload TX, 2.62-2.69 GHz RX), and the LTE Band 46 may operate at a 5.2 GHz frequency with operating channels ranging from 5.15 GHz to 5.925 Ghz. As described above, a collocated WLAN antenna may operate within the 2.4 GHz band with channels between 2.4 GHz and 2.5 GHz, or may operate at a center frequency of 5.2 GHz (e.g. 5.25 GHz to 5.35 GHz and 5.47 GHz to 5.725 GHz).

The microcontroller may instruct the WWAN module to decrease the power of the WWAN transmission by 3 dB, for example, in an embodiment in which the proximity sensor that detected a human body part, as indicated in the microcontroller input triggers 310 on row 304, is located nearby the first WWAN antenna, rather than the second WWAN antenna. In such an embodiment, the microcontroller may only need to decrease the power supplied to the first antenna to lower the SAR nearby the detected human body part, because the human body part was not detected nearby the second WWAN antenna.

In another example embodiment, if the WLAN antenna is radiating according to the first pattern and the proximity sensor has not detected a human body part nearby a transmitting antenna, but link quality trigger inputs indicate an incidence of colocation interference between two antennas, as is shown in row 306, the optimal power reduction configuration may also include reducing the transmission power of the WWAN signal being transmitted according to the LTE Band 7 (B7) by 3 dB if the signal is being transmitted in the low-frequency (L) band, mid-frequency (M) band, or high-frequency (H) band. However, the optimal power reduction configuration for a second WWAN signal being transmitted according to the LTE Band 46 may not include any power reductions, regardless of the transmitting band.

This may be the case, for example, in an embodiment in which the WWAN signal being transmitted in the B7 band is identified as the aggressor signal or cause of the colocation interference. The lower end of the LTE Band 7 (e.g. 2.5 GHz) may cause one or more WWAN antennas to transceive occasionally on a frequency very close to the maximum frequency of 2.5 GHz at which a WLAN transceiving antenna may transmit when operating within the 2.4 GHz WLAN band, potentially causing colocation interference between such antennas. In fact, concurrent transmission of an LTE signal within the 2.5 GHz to 2.6 GHz range and a WLAN 802.11b signal within the higher channels of the 2.4 GHz band is known in the art to present colocation interference. As such, the dynamic tuning and power reduction table in embodiments of the present disclosure associate a detection of colocation interference associated with a WWAN signal transmitted within the LTE Band 7 with a power reduction of 3 dB, across all channels, to combat deleterious effects of colocation interference. The microcontroller may initiate such a power reduction by transmitting an instruction to the WWAN module, which may be operably connected to the microcontroller by a specific, preset port/pin of the microcontroller. The LTE Band 7 and LTE Band 46 are only two examples of possible frequency bands upon which WWAN signals may be transmitted in embodiment and other WWAN frequency bands are also contemplated.

In such a scenario, the microcontroller may only need to decrease transmitting power of the first WWAN signal acting as the aggressor signal to remove the colocation interference. Thus, the microcontroller may dynamically decrease signal power to a lesser degree in the circumstance of detected colocation interference than in the circumstance of detected nearby human body parts. In addition, the microcontroller may decrease the signal power by a flat 3 dB value in the circumstance of detected human body parts, but may decrease the signal power by varying degrees in the circumstance of detected colocation interference to account for a greater likelihood of colocation interference occurring when the WWAN antenna is transmitting in the mid-frequency band (M) than when it is transmitting in either the low-frequency (L) or high-frequency bands (H).

FIG. 5 is a graphical diagram illustrating a WWAN tune code portion of a dynamic tuning and power reduction truth table according to an embodiment of the present disclosure. A dynamic tuning and power reduction truth table in an embodiment may associate one or more microcontroller input triggers with an optimal WWAN tuning configuration for a WWAN wireless link currently transmitting from one or more WWAN antennas. As shown in FIG. 5, the WWAN tuning code portion of the dynamic tuning and power reduction truth table 502 may associate one or microcontroller input triggers 310 with one or more tuning code identifiers 504 providing instructions for a tuning network to tune the signal transmitted from a WWAN module.

The optimal tuning configuration may include different tuning code identifiers for different antennas. For example, the WWAN signal may be transmitted via multiple antennas according to a multiple-input-multiple-output (MIMO) scheme. In such a scenario, the WWAN module may have a first port connected to the first WWAN antenna for transmission of a first WWAN signal at a first power level and a second port connected to the second LTE antenna for transmission of a second WWAN signal at a second power level. Further, the microcontroller in such an embodiment may be operably connected to the first port via a first microcontroller port/pin and to the second port via a second microcontroller port/pin. By transmitting instructions to the first port and the second port separately, via the two separate microcontroller port/pins, the microcontroller may effectively tune the first and second signals differently.

For example, as shown in row 304, the optimal tuning configuration identifier for a first WWAN signal being transmitted within the LTE B7 band by a first port operably connected to the microcontroller may be tuning code 47. However, the optimal tuning configuration identifier for a second WWAN signal being transmitted within the LTE B46 band by a second port operably connected to the microcontroller may be tuning code 7. As another example, as shown in rows 406 and 310, different tuning codes may be identified as optimal in scenarios involving differing trigger inputs. Each tuning code identified as optimal within the dynamic tuning and power reduction truth table in an embodiment may correlate to a separate register describing the operation of a plurality of tunable impedance matching circuits within a tuning network. For example, in an embodiment in which the optimal tuning configuration identifier to a first WWAN signal being transmitted within the LTE B7 band by a first port operably connected to the microcontroller is tuning code 47, the microcontroller may access a separate register or table of information associated with tuning code 47. An example table of information associated with tuning code 47 may be Table 1 shown below.

TABLE 1

| | | | | | | | | | | | |
|---|---|---|---|---|---|---|---|---|---|---|---|
| | | | | | UI1 | | | | | | |
| Freq | Index | C1 | SW1 | SW2 | SW2e | SW3 | SW3e | SW4 | SW4e | SW56e |
| 2500 | 47 | 0 | 1 | 1 | 0 | 1 | 0 | 0 | 1 | 0 | 40 | A5 |
| 2535 | 47 | 0 | 1 | 1 | 0 | 1 | 0 | 0 | 1 | 0 | 40 | A5 |
| 2570 | 47 | 0 | 1 | 1 | 0 | 1 | 0 | 0 | 1 | 0 | 40 | A5 |

The columns SW1 SW56e in an embodiment may refer to a plurality of switches operating to place one or more capacitors, inductors, or impedance matching circuits in an ON or OFF state. Table 1 is only one example of a tuning code register used to tune a signal according to detected operating conditions, as described in the dynamic tuning and power reduction table.

As shown in Table 1, differing combinations of the tuning code identified in the dynamic tuning and power reduction truth table, WWAN transmitting frequencies, and the current WWAN transmitting channel are associated with different sub-register values. For example, the second row of Table 1 provides reference to multiple sub-register values for the scenario in which an WWAN antenna is transmitting a signal on Channel 0, at a frequency of 2500 MHz, and the dynamic tuning and power reduction truth table has pointed the microcontroller to a tune code having a value of 47. As another example, the third row of Table 1 provides reference to multiple sub-register values for the scenario in which a WWAN antenna is transmitting a signal on Channel 0, at a frequency of 2535 MHz, and the dynamic tuning and power reduction truth table has pointed the microcontroller to a tune code having a value of 47. As yet another example, the fourth row of Table 1 provides reference to multiple sub-register values for the scenario in which a WWAN antenna is transmitting a signal on Channel 0, at a frequency of 2570 MHz, and the dynamic tuning and power reduction truth table has pointed the microcontroller to a tune code having a value of 47.

The sub-registers identified in the fourth through thirteenth columns from the left of Table 1 may identify a plurality of stored settings for controlling the capacitance and/or inductance of a plurality of tunable impedance matching circuits. The tunable impedance matching circuits in such an embodiment may be located within one or more tuners (e.g. LTE tuner, WWAN tuner, WLAN tuner, Wi-Fi tuner). By accessing each sub-register identified within a tune code table like Table 1, the microcontroller may identify the inductance and/or capacitance needed to make each of the tunable impedance matching circuits apply an impedance to incoming signals so as to optimize the incoming signals.

By instructing the plurality of tunable impedance matching circuits to operate according to such an optimal tuning configuration, the microcontroller may adaptively tune each WWAN signal (or an LTE signal in other embodiments) based on the current operating conditions of the information handling system, as described by the input triggers. Tuning the tunable impedance matching circuits in an embodiment may lessen the effects of colocation interference such that the microcontroller needs to decrease the power of the transmitting aggressor signal by a lesser amount, if at all, in order to overcome the deleterious effects of the colocation interference. In such a way, the microcontroller may avoid unnecessary reductions in transmission power of the aggressor signal, allowing both the aggressor signal and victim signal to transmit at higher power levels (thus increasing signal strength) while simultaneously removing the deleterious effects of the colocation interference.

In some embodiments the WLAN power cut back portion of the dynamic tuning and power reduction truth table described with reference to FIG. 3, the WWAN power cut back portion of the dynamic tuning and power reduction truth table described with reference to FIG. 4, and the WWAN tune code portion of the dynamic tuning and power reduction truth table described with reference to FIG. 5 may be combined into a single dynamic tuning and power reduction truth table.

Figure 6:
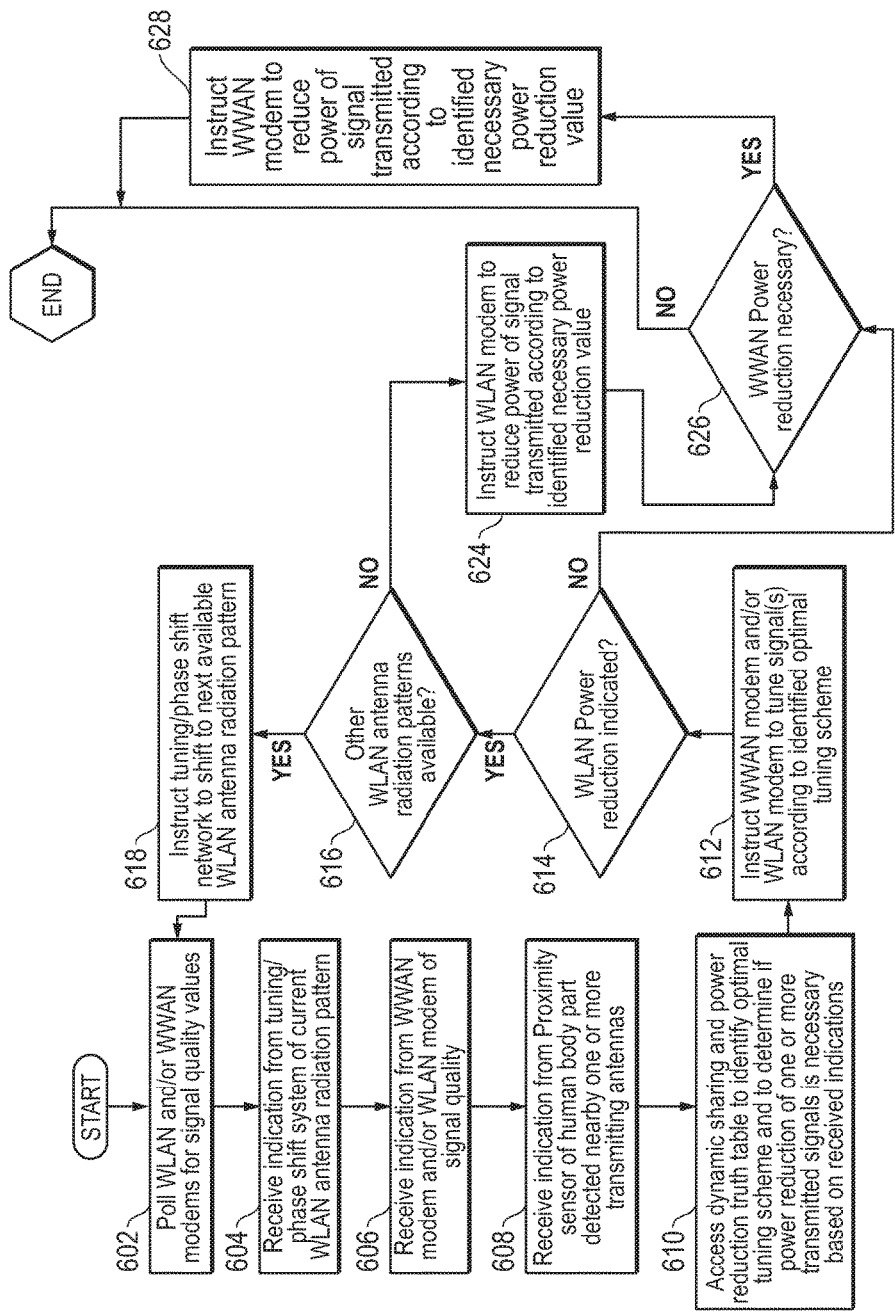
FIG. 6 is a flow diagram illustrating a method of dynamically reducing power supplied to a transmitting signal based on received antenna input triggers according to an embodiment of the present disclosure.

FIG. 6 is a flow diagram illustrating a method of dynamically reducing power supplied to a transmitting signal or implementing antenna tuning based on received antenna input triggers according to an embodiment of the present disclosure. At block 602, in an embodiment, WLAN and WWAN modems may be polled for signal quality information or values. For example, a microcontroller may poll a WLAN module and/or a WWAN module periodically in set periods of time to determine current WLAN and WWAN signal quality. The microcontroller in such an embodiment may poll antenna trigger input data from the capacitive/proximity sensor system, an embedded controller for configuration data, the WLAN modem for WLAN signal quality, the WWAN modem for WWAN signal quality and WWAN tuning information, and a tuning and phase shift network within a unified antenna front end module for WLAN for WLAN signal tuning and WLAN antenna radiation pattern information. In other embodiments, the microcontroller may poll antenna trigger input data from an LTE module for LTE signal quality and LTE tuning information, from a Wi-Fi modem for Wi-Fi signal quality, and a Wi-Fi tuning and phase shift network within a unified antenna front end module for Wi-Fi for Wi-Fi signal tuning and Wi-Fi antenna radiation pattern information. Such polling in some embodiments may occur along $I^2C$ data lines connecting the microcontroller to the WWAN module, the WLAN module, the WLAN module, the WWAN module, the embedded controller, the proximity sensor, the WLAN front end module, and/or the WWAN front end module. In other embodiments, data transfer may occur along MIPI and/or GPIO data lines. Data received in response to such polling may be referred to as antenna trigger data or trigger inputs in embodiments described herein. In some embodiments, the microcontroller may have a slave/master relationship with each of the slave trigger input data providers such as the WWAN module, the WLAN module, the embedded controller, the proximity sensor, the WLAN front end module, and/or the WWAN front end module.

At block 604 in an embodiment, an indication may be received from tuning and/or phase shift system of current WLAN antenna radiation pattern. In response to the polling of block 602, in an embodiment, the microcontroller may receive an indication from the tuning and phase shift network within the WLAN front end module of the current WLAN antenna radiation pattern. In other embodiments, at block 604, the microcontroller may receive an indication from the tuning and phase shift network within a Wi-Fi front end module of the current Wi-Fi antenna radiation pattern. The antenna radiation pattern may be identified by a number value. In an embodiment in which four different antenna radiation patterns may be used, the antenna radiation pattern may be identified, for example, by a number between one and four. A WLAN antenna radiation pattern having a value of zero in such an embodiment may indicate, for example, that no WLAN signal is currently being transmitted. Other embodiments may include any number of different antenna radiation patterns and may thus have any number of numeric values.

Trigger input data providers such as the WLAN module and/or Wi-Fi module in an embodiment may respond to polling from the microcontroller with reports related to measurements or status determinations. Further, antenna trigger data provider slave devices may also obtain attention of the microcontroller via GPIO interrupt operation along the same or different communication lines as the $I^2C$ data lines connecting these devices in some embodiments. Upon an event, an interrupt signal transmitted to microcontroller may cause the microcontroller to configure the data lines to operate as an $I^2C$ communication line and query the slave antenna trigger data device to provide the event information.

In other embodiments, the microcontroller may receive an indication from the tuning and phase shift network within the WWAN front end module of the current WWAN antenna radiation pattern similar to that described above for the WLAN systems. It is appreciated that such data may be used for coordinated reconfigurability of the WWAN antenna radiation patterns in view of WLAN wireless operating conditions similar to the embodiments described herein for WLAN antenna pattern coordinated configuration with consideration of WWAN wireless operating conditions.

At block 606, in an embodiment, an indication may be received from the WWAN modem and/or WLAN modem of signal quality. For example, a WWAN module and/or WLAN module in an embodiment may respond to the polling of block 602 to transmit signal condition data to the microcontroller. In other embodiments, a Wi-Fi module and/or LTE module may respond to the polling of block 602 to transmit signal condition data of the Wi-Fi and/or LTE signals to the microcontroller. In an embodiment, the microcontroller may receive WWAN or WLAN signal condition data such as received signal strength (RSSI), signal to noise ratio (SNR), modulation coding scheme index (MCS), bit error rates (BER), transmission power levels, reception power levels, TX/RX status, data packet volumes and other data reported by the WWAN module or WLAN module.

In some embodiments, the microcontroller may analyze the received signal condition data to determine whether an instance of colocation interference is occurring between one or more antennas, and/or the identity of the aggressor signal causing the colocation interference. In such embodiments, the microcontroller may then assign a number value indicating the identification of the aggressor signal to the detected occurrence of colocation interference. For example, in an embodiment in which four antennas are capable of transmitting signals, each antenna may be associated with a number value between one and four. The microcontroller in such an example embodiment may associate the detected instance of colocation interference with a transmission/reception trigger input data having the same number value as the number value assigned to the antenna identified as transmitting the aggressor signal. In other aspects of such an embodiment, the microcontroller may assign a number value of zero to a TX/RX trigger input if no colocation interference is detected. In other embodiments, any number of transmitting antennas may be used, and thus, any number of transmission/reception trigger input number values may also be employed.

In other embodiments, the analysis of the received signal condition data, determination of an instance of colocation interference, identification of the aggressor signal, and/or association of the identified aggressor signal with a transmission/reception trigger input having a number value may occur outside the microcontroller, such as, for example, within the WWAN module, WLAN module such as a Wi-Fi module, or LTE module. In such an embodiment, the microcontroller may receive the transmission/reception trigger input having a number value at block 606.

At block 608, in an embodiment, an indication may be received from the proximity sensor of a human body part detected nearby one or more transmitting antennas. For example, the proximity sensor in an embodiment may respond to the polling of block 602 by transmitting an indication of a detected nearby human body part to the microcontroller. In an embodiment, the microcontroller may receive an indication from the proximity sensor that a human body part has been detected nearby a transmitting antenna, along with an identification of which transmitting antenna(s) are located nearby the detected human body part. For example, in an embodiment in which four transceiving antennas may be capable of transmitting multiple input/multiple output (MIMO) signals including combinations of one or more of each of WWAN, WLAN, Bluetooth, GPS and other signals, a human body part may have been detected nearby a first, second, third, and/or fourth transmitting antenna. In such an embodiment, a proximity sensor may transmit a P-sensor trigger input having a number value to the microcontroller identifying one or more of the first, second, third, and/or fourth transmitting antennas as being located nearby a human body part. In other aspects of such an embodiment, the microcontroller may assign a number value of zero to a P-sensor trigger input if no human body part is detected nearby. In other embodiments, any number of transmitting antennas may be used, and thus, any number of P-Sensor trigger input number values may also be employed.

At block 610, in an embodiment, a dynamic tuning and power reduction truth table may be accessed to identify an optimal tuning scheme and to determine if power reduction of one or more transmitted signals is necessary based on received indications or trigger inputs. For example, a microcontroller in an embodiment may access a dynamic tuning and power reduction truth table to identify an optimal tuning scheme for a WWAN signal, WLAN signal, Wi-Fi signal, and/or LTE signal, and to determine if power reduction of one or more transmitted signals (e.g. WLAN, WWAN, LTE, Wi-Fi) is necessary based on received indications of a plurality of trigger inputs. In some embodiments, the dynamic tuning and power reduction truth table may be stored in random access memory (RAM) of an WWAN module, a WLAN module, a WWAN front end, and/or an WLAN front end module. In other embodiments, the dynamic tuning and power reduction truth table may be stored in another portion of the wireless adapter.

A dynamic tuning and power reduction truth table in an embodiment may associate a combination of a plurality of trigger inputs with one or more of a WLAN power reduction, a WWAN power reduction, and a WWAN tuning code or WLAN tuning code. For example, as described above with reference to FIG. 3, the trigger inputs within a dynamic tuning and power reduction truth table in an embodiment may describe a plurality of scenarios. For example, row 304 of the truth table 302 may include input triggers indicating: (1) the WLAN antenna is operating according to a first antenna radiation pattern; (2) the existence of colocation interference between concurrently transmitted signals with the WWAN signal transmitted by a first antenna acting as the aggressor signal; (3) detection of a human body part nearby a WWAN and/or WLAN antenna; and (4) the information handling system is operating according to a first orientation (e.g. laptop, closed, or tablet configuration). As another example, row 306 of the truth table 302 may include input triggers indicating: (1) the WLAN antenna is operating according to a second antenna radiation pattern; (2) the existence of colocation interference between concurrently transmitted signals with the WWAN signal transmitted by a first antenna acting as the aggressor signal; (3) no detection of a human body part nearby any antenna; and (4) the information handling system is operating according to a first orientation (e.g. laptop, closed, or tablet configuration). The dynamic tuning and power reduction truth table may associate the combination of trigger inputs described in each row with a specific Wi-Fi power reduction value, a specific WWAN power reduction value, and/or a specific WLAN tuning scheme, as described in greater detail below with reference to FIG. 7.

At block 612, in an embodiment, the microcontroller may instruct the WWAN module and/or WLAN module to tune the signal(s) according to an identified optimal tuning scheme. Upon identifying the tuning codes associated with each wireless link signal in the dynamic tuning and power reduction table, the microcontroller may access registers associated with these tuning codes in order to retrieve proper settings (e.g. inductance and capacitance values) for a plurality of tunable impedance matching circuits residing within one or more tuners (e.g. LTE tuner, Wi-Fi tuner, WLAN tuner, and/or WWAN tuner). The microcontroller may then transmit instructions to set the impedance matching circuits within each of these tuners to the appropriate tuners. For example, the microcontroller in an embodiment in which a human body part has been detected nearby a first WWAN antenna may transmit instructions to a WWAN tuner within a WWAN module to set the inductance and capacitance values of the impedance matching circuits through which the signal being transmitted from the first WWAN antenna operably connected to the B7 port pin connector of the microcontroller passes to the values identified by the sub-registers identified within Table 1.

At block 614, it may be determined whether a WLAN power reduction is indicated. The microcontroller in an embodiment may determine whether a WLAN power reduction is indicated by associating the trigger inputs received at blocks 604-608 with a WLAN power reduction value in the dynamic tuning and power reduction truth table. If, the WLAN power reduction values associated with these trigger inputs at block 610 in an embodiment have a value greater than zero, indicating a WLAN power reduction is indicated, the method may proceed to block 616. If, the WLAN power reduction values associated with these trigger inputs at block 610 in an embodiment have a value of zero, indicating a WLAN power reduction is not indicated, the method may proceed to block 626.

At block 616, it may be determined whether other WLAN antenna radiation patterns are available. In some embodiments, antenna systems of the information handling system may include a WLAN parasitic antenna which may permit control over the antenna radiation pattern of the WLAN antenna. Similar parasitic element interfaces may be used to control radiation patterns for LTE or Wi-Fi antennas as applicable. The microcontroller may provide for control over phase shifting the coupling currents to the Wi-Fi, or WLAN parasitic antenna. Activation of increased phase shift to the parasitic antenna or decreased phase shift of other parasitic elements or other transmitting device may be used to steer an antenna transmission pattern, and thus, to influence directivity patterns for the WLAN antenna or any other WLAN antenna systems deployed in an information handling system. The tuning and phase shift network of the present embodiment may implement pattern decorrelation by finding the radiation pattern pair between the main and auxiliary antenna ports with orthogonal directivity that enhances the RSSI, SNR or other signal quality of one or more transceiving signals. By using a parasitic coupling element with a variable impedance termination and which may be triggered by a switch, the system may control the directionality of the transmission signal to thereby cause a shift of transmission pattern. The tuning and phase shift network may control this tuning for the antenna ports for the WLAN antenna (or in some embodiments, a Wi-Fi antenna) to alter RF transmission pattern and potentially improve RSSI, SNR, MCS or other performance factors of one or more transceiving signals (e.g. Wi-Fi, LTE, WWAN, WLAN).

When a decrease in signal quality is detected, such deleterious effects may be removed by tuning of one or more signals, reduction of power to one or more signals, and/or shifting the antenna radiation pattern for one or more signals according to some embodiments. Reduction of power to one or more signals may remove deleterious effects causing signal quality to degrade on one signal, while degrading signal quality on another signal. Thus, other options for improving overall signal quality on all transceiving signals may be considered before reducing power of any signals. As such, when a reduction in power of any signal is indicated in some embodiments, the microcontroller may investigate whether other antenna radiation patterns are available as a means of avoiding decreasing transmission power of any transceiving signals. If other WLAN antenna radiation patterns are available, the method may move to block 618. If other WLAN antenna radiation patterns are not available, or the microcontroller has determined each of the antenna radiation patterns are associated with a decrease in WLAN signal power within the dynamic tuning and power reduction truth table, the method may move to block 624. Such a scenario may occur, for example, if the reduction in WLAN signal power is indicated as a consequence of a human body part being detected nearby the WLAN transmitting antenna.

At block 618, if the microcontroller determines other WLAN antenna radiation patterns may be used, the microcontroller may instruct the tuning/phase shift network within the WLAN module to shift to the next available WLAN antenna radiation pattern. Such a shift may remove any deleterious effects on transceiving signals without applying a reduction in the power supplied to any of the transmitting signals. In order to determine whether the shift has successfully addressed any deleterious colocation interference effects, the method may move to block 602, where the microcontroller may again poll WLAN and WWAN modems for signal quality values.

At block 624, if the microcontroller determines other WLAN antenna radiation patterns are not available, that all available WLAN antenna radiation patterns are associated with a decrease in WLAN signal power (e.g. the trigger inputs received at block 608 indicate a human body part has been detected nearby the transmitting WLAN antenna), or that the power reduction associated with the current operating frequency range in the dynamic tuning and power reduction table is lesser than the power reduction associated with other frequency ranges within the same band, the microcontroller may instruct the WLAN modem to reduce the power of the signal transmitted according to the identified necessary power reduction value. For example, in the embodiment described with reference to FIG. 3, the microcontroller may determine all WLAN antenna radiation patterns associated with a P-Sensor trigger input having a value of 1 are associated with a WLAN power reduction, and instruct the WLAN module to decrease the power supplied to the WLAN signal being transmitted in a 5 GHz band by a value of 3 dB.

At block 626, it may be determined whether a reduction in power for the WWAN signal is indicated. As described with reference to FIG. 4, the microcontroller in an embodiment may determine by reference to row 304 of the dynamic tuning and power reduction table 402 that the optimal power reduction configuration in a scenario in which the proximity sensor has detected a human body part nearby the transmitting WWAN antenna includes reducing the transmission power of a first WWAN signal being transmitted by a first port operably connected to the microcontroller B7 pin by 3 dB if the signal is being transmitted in the low-frequency (L) band, mid-frequency (M) band, or high-frequency (H) band, but does not include any power reduction for a second WWAN signal being transmitted by a second port operably connected to the microcontroller B46. If a WWAN power reduction is necessary, the method may proceed to block 628. If a WWAN power reduction is not necessary, the method may end.

At block 628, in an embodiment, the WWAN module may be instructed to reduce power of the signal transmitted according to the identified necessary WWAN power reduction value. For example, as described with reference to FIG. 4, in a scenario in which the proximity sensor has detected a human body part nearby the transmitting WWAN antenna, the microcontroller in an embodiment may instruct the WWAN module to reduce the transmission power of a first WWAN signal being transmitted by a first port operably connected to the microcontroller B7 pin by 3 dB. The method may then end.

Figure 7:
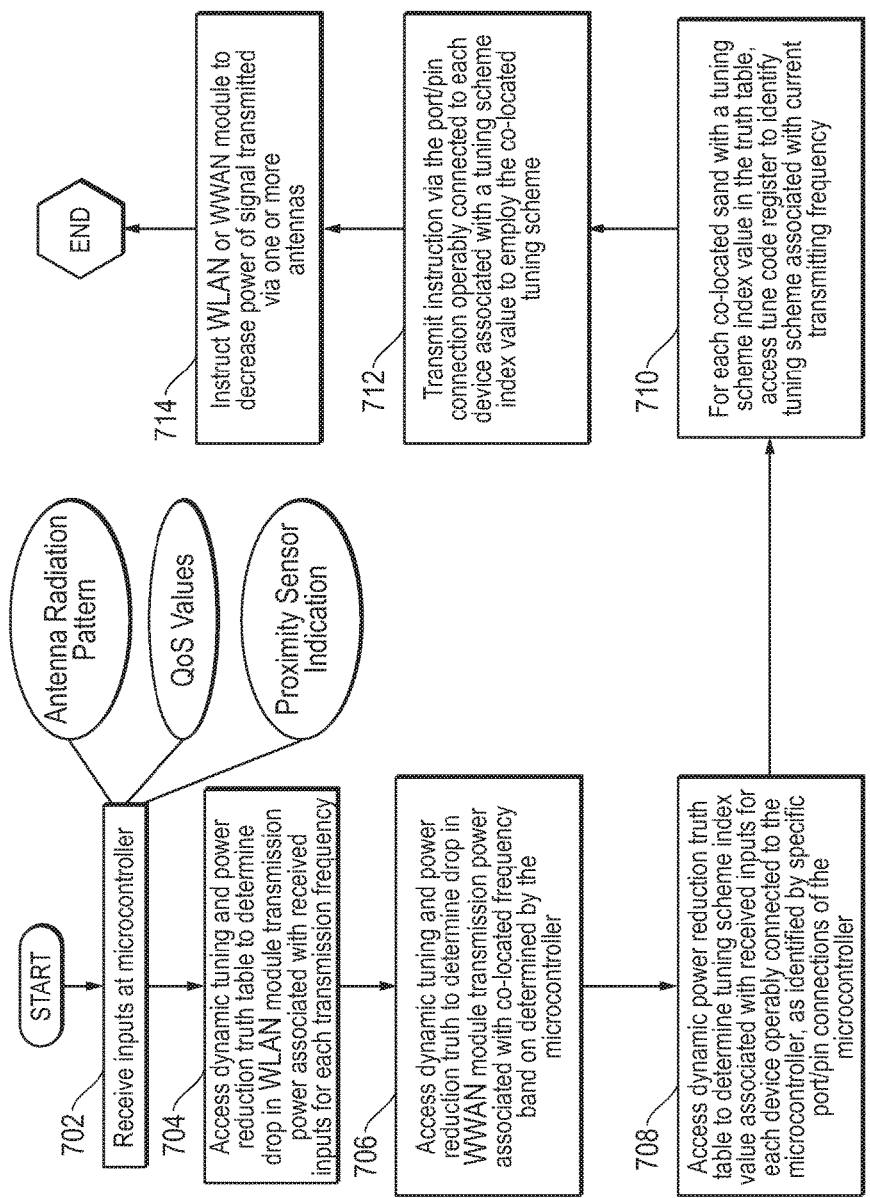
FIG. 7 is a flow diagram illustrating a method of determining if power reduction of one or more transmitted signals is necessary according to embodiments of the present disclosure.

FIG. 7 is a flow diagram illustrating a method of identifying an optimal tuning scheme and determining if power reduction of one or more transmitted signals is necessary based on received trigger inputs according to embodiments of the present disclosure. At block 702 in an embodiment, antenna trigger inputs may be received at a microcontroller. Such trigger inputs may include one or more of quality of service (QoS) indicators for one or more transceiving signals, current antenna radiation patterns for one or more transceiving signals, and/or proximity sensor indications of a human body part detected nearby one or more transceiving antennas.

At block 704, in an embodiment, the dynamic tuning and power reduction truth table may be accessed to determine a drop in WLAN module transmission power associated with the received inputs for each transmission frequency. The specific combination of trigger inputs received at block 702 may be identified within a single row of the dynamic tuning and power reduction truth table in an embodiment. For example, with reference to an embodiment described with reference to FIG. 3, row 304 of the truth table 302 may include input triggers indicating: (1) the WLAN antenna is operating according to a first antenna radiation pattern; (2) the existence of colocation interference between concurrently transmitted signals with the WWAN signal transmitted by a first antenna acting as the aggressor signal; (3) detection of a human body part nearby a WWAN and/or WLAN antenna; and (4) the information handling system is operating according to a first orientation (e.g. laptop, closed, or tablet configuration). As another example, row 306 of the truth table 302 may include input triggers indicating: (1) the WLAN antenna is operating according to a second antenna radiation pattern; (2) the existence of colocation interference between concurrently transmitted signals with the WWAN signal transmitted by a first antenna acting as the aggressor signal; (3) no detection of a human body part nearby any antenna; and (4) the information handling system is operating according to a first orientation (e.g. laptop, closed, or tablet configuration).

As also shown in FIG. 3, the dynamic tuning and power reduction truth table may associate the combination of these trigger inputs with a WLAN power reduction value. For example, the dynamic tuning and power reduction truth table may associate the trigger inputs of row 304 indicating a human body part has been detected nearby the WLAN antenna with a reduction in the transmission power of the WLAN signal by 2 dB if the signal is being transmitted in the 2.4 GHz low-frequency (L) band, by 3 dB if the signal is being transmitted in the 2.4 GHz mid-frequency (M) band, by 1 dB if the signal is being transmitted in the 2.4 GHz high-frequency (H) band, or by 3 dB if the signal is being transmitted in any of the 5 GHz bands. As another example, the dynamic tuning and power reduction truth table may associate the trigger inputs of row 306 with no reduction in the transmission power of the WLAN signal, regardless of the band in which the WLAN antenna is transmitting the signal. This may be the case because the trigger inputs indicate WLAN signal is not the aggressor signal, and thus, no reduction in power supplied to the WLAN signal is needed.

At block 706, the dynamic tuning and power reduction truth table may be accessed to determine a drop in WWAN module transmission power associated with received inputs for each device operably connected to the microcontroller, as identified by specific port/pin connections of the microcontroller. For example, in an embodiment described with reference to FIG. 4, the dynamic tuning and power reduction truth table may associate the combination of the same trigger inputs described directly above with a WWAN power reduction value. The dynamic tuning and power reduction truth table in such an example embodiment may associate the trigger inputs of row 304 indicating a human body part has been detected nearby the WWAN antenna with a reduction in the transmission power of a first WWAN signal being transmitted by a first port operably connected to the microcontroller B7 pin by 3 dB if the signal is being transmitted in the low-frequency (L) band, mid-frequency (M) band, or high-frequency (H) band. However, the optimal power reduction configuration for a second WWAN signal being transmitted by a second port operably connected to the microcontroller B46 pin may not include any power reductions, regardless of the transmitting band. This may be the case, for example, in an embodiment in which the proximity sensor that detected a human body part, as indicated in the microcontroller input triggers 310 on row 304, is located nearby the first WWAN antenna, rather than the second WWAN antenna. In such an embodiment, the microcontroller may only need to decrease the power supplied to the first antenna to lower the SAR nearby the detected human body part, because the human body part was not detected nearby the second WWAN antenna.

As another example, the dynamic tuning and power reduction truth table may associate the trigger inputs of row 306 indicating co-location interference is currently being caused by the first WWAN signal transmitted by a first port operably connected to the microcontroller B7 pin with a reduction in the transmission power of the first WWAN signal by 3 dB if the signal is being transmitted in the low-frequency (L) band, mid-frequency (M) band, or high-frequency (H) band. However, the optimal power reduction configuration for a second WWAN signal being transmitted by a second port operably connected to the microcontroller B46 pin in the same scenario may not include any power reductions, regardless of the transmitting band. This may be the case, for example, in an embodiment in which the WWAN signal being transmitted via the first port is identified as the aggressor signal or cause of the colocation interference. In such a scenario, the microcontroller may only need to decrease transmitting power of the first WWAN signal acting as the aggressor signal to remove the colocation interference. Thus, the microcontroller may dynamically decrease signal power to a lesser degree in the circumstance of detected colocation interference than in the circumstance of detected nearby human body parts.

At block 708, in an embodiment, the dynamic tuning and power reduction truth table may be accessed to determine a tuning scheme index value associated with the received inputs for each device operably connected to the microcontroller, as identified by the specific port/pin connections of the microcontroller. For example, in an embodiment described with reference to FIG. 5, the dynamic tuning and power reduction truth table may associate the combination of the same trigger inputs described above with reference to block 706 and block 704 with a WWAN tuning configuration. For example, the dynamic tuning and power reduction truth table may associate the trigger inputs of row 304 indicating a human body part has been detected nearby the WWAN antenna with an optimal tuning code of 47 for the first WWAN antenna operably connected to the B7 port and pin connector of the microcontroller, and an optimal tuning code of 7 for the second WWAN antenna operably connected to the B46 port and pin connector of the microcontroller, regardless of transmission frequency. As another example, the dynamic tuning and power reduction truth table may associate the trigger inputs of row 306 indicating co-location interference is being caused by the WWAN signal being transmitted from the first WWAN antenna operably connected to the B7 port and pin connector of the microcontroller with an optimal tuning code of 36 for the first WWAN antenna, and an optimal tuning code of 47 for the second WWAN antenna operably connected to the B46 port and pin connector of the microcontroller, regardless of transmission frequency band. The difference between the tuning codes applied to both the first WWAN signal band and the second WWAN signal band in row 304 versus row 306 may, for example, reflect the microcontroller applying shunting the WLAN signal to the WWAN via an S-CRDN when colocation interference is detected. By shunting the WLAN signal in such a way, the microcontroller may increase rejection to the WWAN antenna operating at a similar frequency to the WLAN antenna and remove any co-location interference ringing effects on the received WWAN signal.

At block 710, in an embodiment, a tune code register may be accessed for each device associated with a tuning scheme index value in the truth table. This may be done in order to identify a tuning scheme associated with the current transmitting frequency of the device and the tuning scheme index value identified in the truth table. For example, in an embodiment described with reference to FIG. 5, a tune code table associated with a tuning code index value found in the dynamic tuning and power reduction truth table, like Table 1 above, may be accessed by the microcontroller in order to determine the proper settings for a plurality of tunable impedance matching circuits located within a WLAN tuner or WWAN tuner. As shown in Table 1, differing combinations of the tuning code identified in the dynamic tuning and power reduction truth table, WWAN transmitting frequencies, and the current WWAN transmitting channel are associated with different sub-register values. The sub-registers identified in the fourth through thirteenth columns from the left of Table 1 may identify a plurality of stored settings for controlling the capacitance and/or inductance of a plurality of tunable impedance matching circuits. By accessing each sub-register identified within a tune code table like Table 1, the microcontroller may identify the inductance and/or capacitance needed to make each of the tunable impedance matching circuits apply an impedance to incoming signals so as to optimize the incoming signals.

At block 712, in an embodiment, instructions may be transmitted via the port/pin connection operably connected to each device associated with a tuning scheme index value to employ the tuning scheme associated with that device within the tune code register. For example, in an embodiment, the microcontroller may transmit instructions to a WWAN tuner to set the inductance and/or capacitance values of one or more tunable impedance matching circuits to the values identified in the sub registers associated with the tune code index value found in the dynamic tuning and power reduction truth table according to blocks 708-710. By instructing the plurality of tunable impedance matching circuits to operate according to such an optimal tuning configuration identified in block 710, the microcontroller may adaptively tune each WWAN signal (or LTE signal in other embodiments) based on the current operating conditions of the information handling system, as described by the input triggers. Tuning the tunable impedance matching circuits in an embodiment may lessen the effects of colocation interference such that the microcontroller needs to decrease the power of the transmitting aggressor signal by a lesser amount, if at all, in order to overcome the deleterious effects of the colocation interference. In such a way, the microcontroller may avoid unnecessary reductions in transmission power of the aggressor signal, allowing both the aggressor signal and victim signal to transmit at higher power levels (thus increasing signal strength) while simultaneously removing the deleterious effects of the colocation interference.

At block 714, in an embodiment, the WLAN module and/or WWAN module may be instructed to decrease power of the signals transmitted via one or more WLAN or WWAN antennas by the power reduction values identified in the dynamic tuning and power reduction truth table. For example, the microcontroller in an embodiment may instruct the Wi-Fi module to decrease power of a WLAN signal by the value of the WLAN power reduction identified in the dynamic tuning and power reduction truth table at block 704. In other embodiments, the microcontroller in an embodiment may instruct a Wi-Fi module to decrease power of a Wi-Fi signal by the value of the WLAN power reduction identified in the dynamic tuning and power reduction truth table at block 704. As another example, the microcontroller in an embodiment may instruct the WWAN module to decrease power of a WWAN signal by the value of the WWAN power reduction identified in the dynamic tuning and power reduction truth table at block 706. In other embodiments, the microcontroller in an embodiment may instruct an LTE module to decrease power of a LTE signal by the value of a LTE power reduction identified in the dynamic tuning and power reduction truth table.

The blocks of the flow diagrams of FIGS. 6-7 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims.

In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A wireless adapter front end for an information handling system comprising:
    a wireless adapter for communicating on a plurality of antennas for connection to a plurality of concurrently operating wireless links, wherein at least one of the plurality of antennas is configurable to have a plurality of antenna radiation patterns and is operating in a first antenna radiation pattern;
    a controller operating independently from an operating system of the information handling system;
    the controller executing instructions of a dynamic tuning and power reduction control system to:
    receive a trigger input indicating an operating condition of the plurality of antennas, wherein the trigger input may be selected from one or more indications of a radiation pattern of one or more of the antennas, a shared communication frequency band, a carrier aggregation operation, Specific Absorption Rate (SAR) proximity detection, or operation of a plurality of radio access technologies;
    identify an optimal power reduction configuration associated with the trigger input and the first antenna radiation pattern in a truth table stored in a memory, wherein the optimal power reduction configuration defines a plurality of transmitting power levels, each of the plurality of transmitting power levels associated with one of the plurality of antennas;
    and implement the optimal power reduction configuration among the concurrently operating wireless links.

2. The wireless adapter front end of claim 1 further comprising:
    the controller executing code instructions to:
        identify an optimal tuning configuration associated with the trigger input in the truth table, wherein the optimal tuning configuration defines an operating state for one or more tunable impedance matching circuits within a tuning network; and
        implement the optimal tuning configuration for at least one of the plurality of antennas.

3. The wireless adapter front end of claim 1, wherein the trigger input is an indication from a proximity sensor or a capacitive sensor of a condition requiring a decrease of a transmission power level of one of the plurality of antennas to maintain specific absorption rate (SAR) limits.

4. The wireless adapter front end of claim 1, wherein the trigger input is an indication of multiple input, multiple output (MIMO) operation of a Radio Access Technology (RAT) across the plurality of concurrently active wireless links.

5. The wireless adapter front end of claim 1, wherein the trigger input is an indication of a user configuration mode of the information handling system affecting orientation of the plurality of wireless antennas.

6. The wireless adapter front end of claim 2 wherein the optimal tuning configuration includes tuning a Wireless Local Area Network (WLAN) or Wireless Wide Area Network (WWAN) wireless link further comprising:
    the controller steering an antenna radiation pattern of an antenna configurable to have a plurality of antenna radiation patterns to a second antenna radiation pattern prior to implementing the optimal power reduction configuration.

7. The wireless adapter front end of claim 6 further comprising:
    the controller executing code instructions to:
        poll antenna trigger inputs;
        receive a plurality of updated trigger inputs in response;
        identify an updated optimal tuning configuration associated with the updated trigger inputs and the second antenna radiation pattern in the truth table; and
        implement the updated optimal tuning configuration to avoid interference between concurrently operating wireless links.

8. A computer implemented method comprising:
    detecting, via a controller operating independently of an operating system of the information handling system and executing code instructions of a dynamic tuning and power reduction control system in a wireless adapter front end, a plurality of concurrently operating wireless links operating via a plurality of antennas of an information handling system, wherein at least one of the plurality of antennas is configurable to have a plurality of antenna radiation patterns;
    receiving a trigger input indicating a first operating antenna radiation condition of one Wireless Local Area Network (WLAN) wireless link of the plurality of concurrently operating wireless links and receiving a trigger input indicating a second operating antenna radiation condition of a second Wireless Wide Area Network (WWAN) wireless link of the plurality of concurrently operating wireless links, wherein the trigger input may be selected from one or more indications of an antenna radiation pattern, transmission or reception state, or Specific Absorption Rate (SAR) proximity detection;
    identifying a first optimal tuning and power reduction configuration associated with the trigger input and a first antenna radiation pattern in a truth table stored in a memory, wherein the first optimal tuning and power reduction configuration defines a plurality of transmitting power levels associated with the plurality of antennas and a tuning configuration for at least one antenna of the plurality of antennas; and
    implementing the second optimal power reduction configuration to avoid interference between concurrently operating wireless links;
    steering an antenna radiation pattern of a Wireless Local Area Network (WLAN) antenna configurable to have a plurality of antenna radiation patterns to a second antenna radiation pattern, when the first optimal tuning and power reduction configuration includes decreasing transmission power of a Wireless Local Area Network (WLAN) wireless link;
    identifying a second optimal power reduction configuration associated with the trigger input and the second antenna radiation pattern in the truth table.

9. The computer implemented method of claim 8 wherein the first optimal tuning and power reduction configuration defines an operating state for one or more tunable impedance matching circuits within a tuning network.

10. The computer implemented method of claim 8, wherein implementing the first optimal tuning and power reduction configuration further comprises altering capacitance or impedance to adjust coupling Radio Frequency (RF) currents from at least one of the plurality of antennas to the information handling system chassis.

11. The computer implemented method of claim 8, wherein the trigger input is an indication from a proximity sensor or a capacitive sensor of a condition requiring a decrease of a transmission power level of one of the plurality of antennas to maintain specific absorption rate (SAR) limits.

12. The computer implemented method of claim 8, wherein the trigger input is an indication of multiple input, multiple output (MIMO) operation of a Radio Access Technology (RAT) across the plurality of concurrently active wireless links.

13. The computer implemented method of claim 8, wherein the trigger input is an indication of a user configuration mode of the information handling system affecting orientation of the plurality of wireless antennas.

14. The computer implemented method of claim 8, wherein a second optimal tuning and power reduction configuration includes decreasing transmission power of a Wireless Local Area Network (WLAN) or Wireless Wide Area Network (WWAN) wireless link further comprising:
    polling antenna trigger inputs;
    receiving a plurality of updated trigger inputs in response;
    identifying the second optimal tuning and power reduction configuration associated with the updated trigger inputs and the Wireless Local Area Network (WLAN) or Wireless Wide Area Network (WWAN) wireless link operating conditions in the truth table; and
    dynamically implementing the second optimal tuning and power reduction configuration to avoid interference between concurrently operating wireless links.

15. A wireless adapter front end for an information handling system comprising:
    a wireless adapter for communicating on a plurality of antennas for connection to a plurality of concurrently operating wireless links;
    a first antenna of a plurality of antennas configurable to have a plurality of antenna radiation patterns and is operating in a first antenna radiation pattern;
    the controller executing instructions of a dynamic tuning and power reduction control system to:
    receive a trigger input indicating an operating condition of the plurality of antennas, wherein the trigger input may be selected from one or more indications of a radiation pattern of one or more of the antennas, a shared communication frequency band, a carrier aggregation operation, Specific Absorption Rate (SAR) proximity detection, or operation of a plurality of radio access technologies;
    identify a first optimal tuning and power reduction configuration associated with the trigger input and the first antenna radiation pattern in a truth table stored in a memory, wherein the first optimal tuning and power reduction configuration defines a plurality of transmitting power levels associated with the plurality of antennas;
    steer the first antenna radiation pattern of the first antenna configurable to have a plurality of antenna radiation patterns to a second antenna radiation pattern, when the first optimal tuning and power reduction configuration includes decreasing transmission power of at least one wireless link of the plurality of concurrently operating wireless links;
    determine when the second radiation pattern also requires a decrease in transmission power of the at least one wireless link according to a second optimal tuning and power reduction configuration in the truth table;
    and implement the optimal tuning and power reduction configuration requiring a smaller decrease in transmission power of the at least one wireless link of the plurality of concurrently operating wireless links.

16. The wireless adapter front end of claim 15 further comprising:
    the controller executing code instructions to:
    poll antenna trigger inputs;
    receive a plurality of updated trigger inputs in response;
    identify a third optimal tuning and power reduction configuration associated with the updated trigger inputs and the second antenna radiation pattern in the truth table; and
    implement the third optimal tuning and power reduction configuration to avoid interference between concurrently operating wireless links.

17. The wireless adapter front end of claim 15 further comprising:
    the controller executing code instructions to:
    determine the second optimal tuning and power reduction configuration does not include decreasing transmission power of the at least one wireless link, wherein the second optimal tuning configuration defines an operating state for one or more tunable impedance matching circuits within a tuning network; and
    implement the second optimal tuning and power reduction configuration.

18. The wireless adapter front end of claim 15, wherein the trigger input is an indication from a proximity sensor or a capacitive sensor of a condition requiring a decrease of a transmission power level of one of the plurality of antennas to maintain specific absorption rate (SAR) limits.

19. The wireless adapter front end of claim 15, wherein the trigger input is an indication of multiple input, multiple output (MIMO) operation of a Radio Access Technology (RAT) across the plurality of concurrently active wireless links.

20. The wireless adapter front end of claim 15, wherein the trigger input is an indication of a user configuration mode of the information handling system affecting orientation of the plurality of wireless antennas.

* * * * *